(12) United States Patent
Jun et al.

(10) Patent No.: US 10,528,218 B2
(45) Date of Patent: Jan. 7, 2020

(54) ELECTRONIC DEVICE AND OPERATING METHOD OF THE SAME

(71) Applicant: SAMSUNG ELECTRONICS CO., LTD., Suwon-si (KR)

(72) Inventors: Justin Jun, Surrey (GB); Kap-su Han, Ulsan (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 148 days.

(21) Appl. No.: 15/196,794

(22) Filed: Jun. 29, 2016

(65) Prior Publication Data

US 2017/0060391 A1 Mar. 2, 2017

(30) Foreign Application Priority Data

Aug. 28, 2015 (GB) .................................. 1515334.9
Nov. 30, 2015 (KR) ........................ 10-2015-0169281

(51) Int. Cl.
G06F 3/0482 (2013.01)
G06F 3/0481 (2013.01)
G06F 3/0488 (2013.01)
G06F 1/16 (2006.01)

(52) U.S. Cl.
CPC ........ *G06F 3/04817* (2013.01); *G06F 1/1643* (2013.01); *G06F 3/0482* (2013.01); *G06F 3/0488* (2013.01); *G06F 2200/1614* (2013.01)

(58) Field of Classification Search
CPC ... G06F 3/0482; G06F 3/0488; G06F 3/04817
See application file for complete search history.

(56) References Cited

U.S. PATENT DOCUMENTS

| 8,665,238 B1* | 3/2014 | Gossweiler, III ..... G06F 3/0488 345/173 |
| 8,769,431 B1 | 7/2014 | Prasad |
| 8,819,569 B2 | 8/2014 | SanGiovanni et al. |
| 8,826,178 B1* | 9/2014 | Zhang ................... G06F 1/1694 345/173 |
| 9,405,400 B1* | 8/2016 | Khafizov .............. G06F 3/0418 |
| 9,406,025 B2* | 8/2016 | Hewitt .................. G06F 3/0416 |
| 2003/0189552 A1* | 10/2003 | Chuang ................... G06F 3/045 345/173 |

(Continued)

FOREIGN PATENT DOCUMENTS

| EP | 2 146 271 A2 | 1/2010 |
| EP | 2219105 A1 | 8/2010 |

(Continued)

OTHER PUBLICATIONS

Communication dated Dec. 31, 2014, issued by the Intellectual Property Office of the United Kingdom in counterpart GB Application No. 1418279.4.

(Continued)

*Primary Examiner* — Phenuel S Salomon
(74) *Attorney, Agent, or Firm* — Sughrue Mion, PLLC

(57) ABSTRACT

An electronic device including a display configured to display at least one graphical user interface (GUI) element, and a controller configured to identify a user-preferred region preferred by a user on the display and control the display to display the at least one GUI element in the identified user-preferred region.

18 Claims, 48 Drawing Sheets

(56) References Cited

U.S. PATENT DOCUMENTS

| | | | |
|---|---|---|---|
| 2006/0007177 A1* | 1/2006 | McLintock | G06F 3/0428 345/173 |
| 2008/0150909 A1* | 6/2008 | North | G06F 3/0418 345/173 |
| 2008/0276170 A1 | 11/2008 | Bonansea et al. | |
| 2009/0327886 A1* | 12/2009 | Whytock | G06F 3/0421 715/702 |
| 2010/0146437 A1 | 6/2010 | Woodcock et al. | |
| 2010/0299592 A1* | 11/2010 | Zalewski | G06F 1/1626 715/243 |
| 2011/0041096 A1* | 2/2011 | Larco | G06F 3/0482 715/835 |
| 2011/0096011 A1* | 4/2011 | Suzuki | G06F 3/0418 345/173 |
| 2011/0271216 A1* | 11/2011 | Wilson | G06F 3/0481 715/765 |
| 2012/0274547 A1* | 11/2012 | Raeber | G06F 3/04886 345/156 |
| 2013/0016129 A1* | 1/2013 | Gossweiler, III | G06F 3/012 345/667 |
| 2013/0127738 A1* | 5/2013 | Miller | G06F 3/0488 345/173 |
| 2013/0169579 A1* | 7/2013 | Havnor | G06F 3/04883 345/173 |
| 2013/0307801 A1* | 11/2013 | Nam | G06F 3/041 345/173 |
| 2014/0019461 A1* | 1/2014 | Bredenberg | G06Q 30/02 707/754 |
| 2014/0068498 A1* | 3/2014 | Olsen | G06F 11/32 715/781 |
| 2014/0092043 A1 | 4/2014 | de Leon et al. | |
| 2014/0101616 A1 | 4/2014 | Kim et al. | |
| 2014/0143728 A1 | 5/2014 | Coleman, Jr. et al. | |
| 2014/0152593 A1* | 6/2014 | Wu | G06F 3/0416 345/173 |
| 2015/0062036 A1 | 3/2015 | Tasaki et al. | |
| 2015/0186011 A1 | 7/2015 | Clausen et al. | |
| 2016/0034131 A1* | 2/2016 | Kosaka | G06F 3/0488 715/765 |
| 2016/0170579 A1* | 6/2016 | Li | G06F 3/0482 715/778 |
| 2016/0274686 A1* | 9/2016 | Alonso Ruiz | G06F 3/03547 |
| 2016/0313875 A1* | 10/2016 | Williams | G06F 3/0482 |
| 2016/0328084 A1* | 11/2016 | Barat | G06F 3/0418 |
| 2016/0357429 A1* | 12/2016 | Nilo | G06F 3/0416 |
| 2016/0360336 A1* | 12/2016 | Gross | H04W 4/025 |
| 2017/0168711 A1* | 6/2017 | Temple | G06F 3/0233 |

FOREIGN PATENT DOCUMENTS

| | | |
|---|---|---|
| KR | 1020140094868 A | 7/2014 |
| KR | 10-2015-0021977 A | 3/2015 |
| TW | 201024906 A1 | 7/2010 |

OTHER PUBLICATIONS

International Search Report and Written Opinion dated Sep. 5, 2016 issued by the International Searching Authority in counterpart International Application No. PCT/KR2016/006147 (PCT/ISA/210, PCT/ISA/220, and PCT/ISA/237).

Communication dated May 7, 2018, issued by the European Patent Office in counterpart European Application No. 16842091.7.

\* cited by examiner

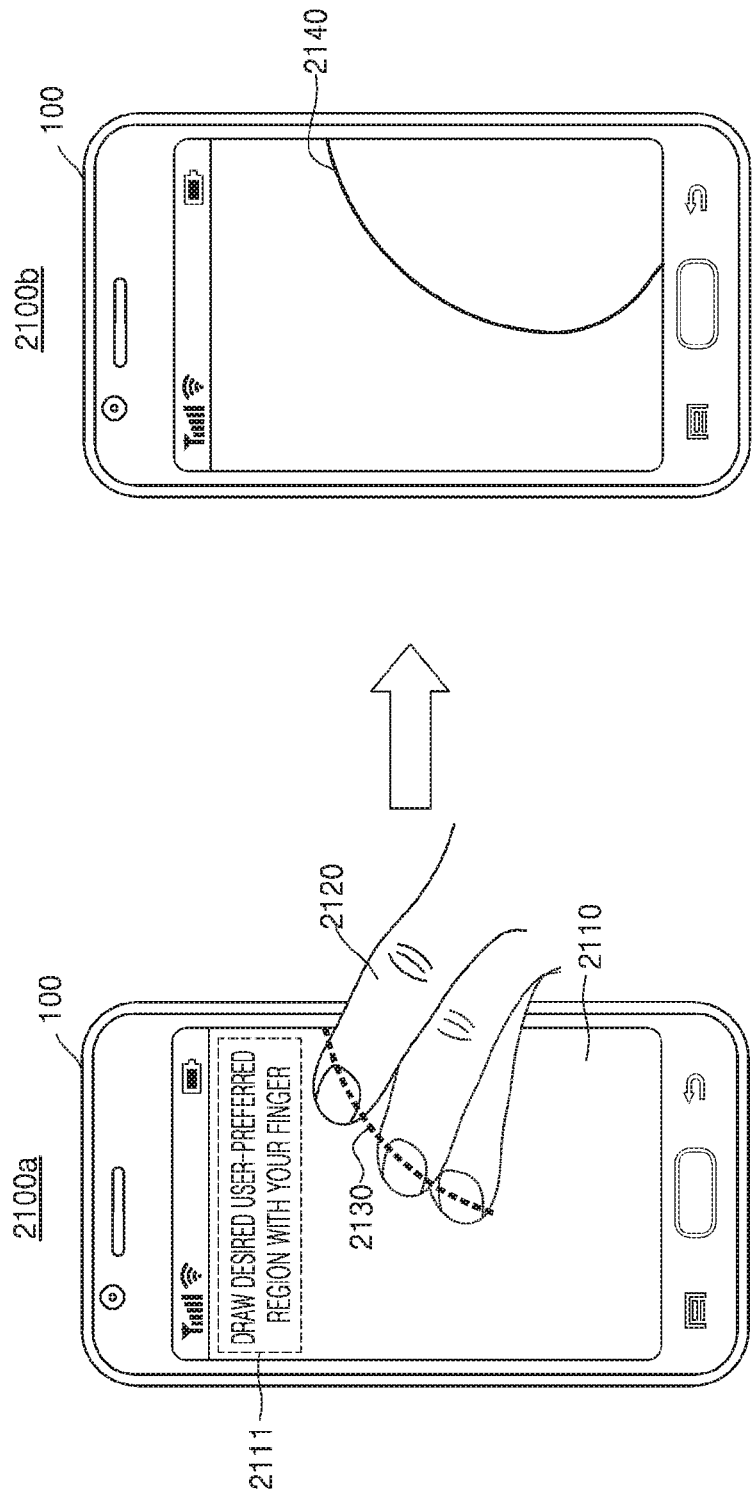

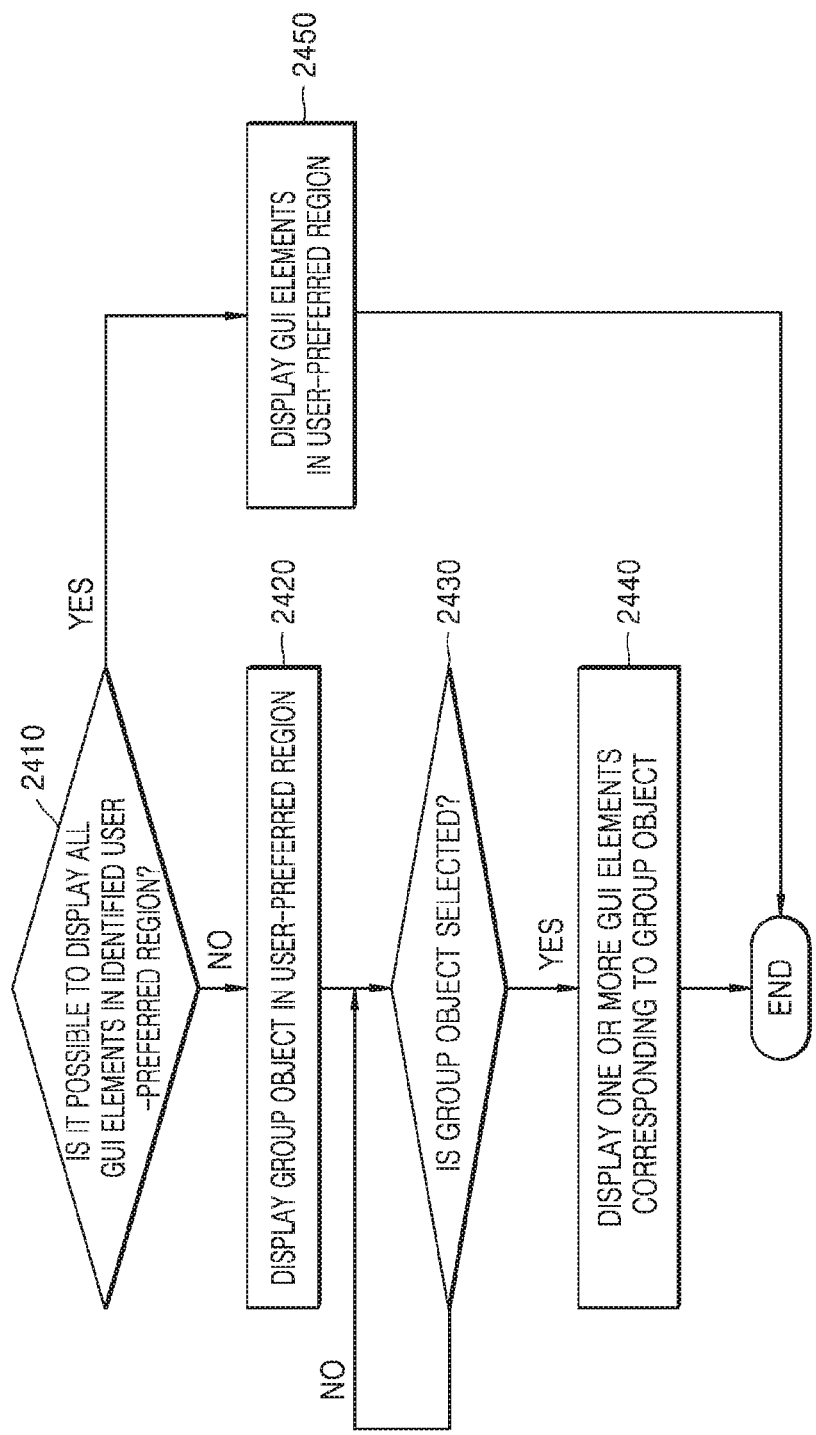

ELECTRONIC DEVICE AND OPERATING METHOD OF THE SAME

CROSS-REFERENCE TO RELATED APPLICATIONS

This application claims the benefit of United Kingdom Patent Application No. 1515334.9, filed on Aug. 28, 2015, in the Intellectual Property Office of the United Kingdom and Korean Patent Application No. 10-2015-0169281, filed on Nov. 30, 2015, in the Korean Intellectual Property Office, the disclosures of which are incorporated herein by reference in their entireties.

BACKGROUND

1. Field

Methods and apparatuses consistent with exemplary embodiments relate to an electronic device and an operating method of the same, and more particularly, to an electronic device for displaying a graphical user interface (GUI) element and a method of operating the electronic device to display the GUI element.

2. Description of the Related Art

With the recent development of touch screen technology, touch screens are widely used in user devices. Displays of many touch screen devices, such as smart phones and tablet devices, are so large that it is sometimes difficult for users to consistently handle the devices, particularly when holding and manipulating the devices with one hand. For example, in existing smart phone operating systems, notifications are displayed near an upper edge of the screen. Therefore, when a user holds and operates the smart phone with one hand, the user may experience difficulty in reaching the notifications displayed near the upper edge of the display.

To solve this problem, an interface in which icons are displayed according to a curved surface near a corner of a screen has been developed. According to biomechanics, when the relative positions of a user's hand and a screen are fixed, a thumb or another finger of the user draws an arc on the screen, and thus a curved path is selected. A system designer defines the radius of curvature suitable for the average finger shape and length of a large population. Therefore, an individual user whose features are considerably different from population averages may still be inconvenienced when using the interface.

SUMMARY

Exemplary embodiments relate to an electronic device capable of displaying a graphical user interface (GUI) element in a display region that is easily manipulated with a hand of a user and a corresponding method of operating the electronic device.

According to an aspect of an exemplary embodiment, there is provided an electronic device including a display configured to display at least one GUI element, and a controller configured to identify a user-preferred region of a user on the display and control the display to display the at least one GUI element in the user-preferred region.

The controller according to an exemplary embodiment may detect orientation of the electronic device, and identify the user-preferred region based on the detected orientation.

The controller according to an exemplary embodiment may detect a hand of the user that grasps the electronic device, and identify the user-preferred region based on the hand of the user.

The controller according to an exemplary embodiment may monitor an interaction between the user and the electronic device, and identify the user-preferred region based on at least one display region of the display in which the interaction occurs.

The controller according to an exemplary embodiment may determine the at least one display region by monitoring the interaction between the user and the electronic device for at least one predetermined application.

The controller according to an exemplary embodiment may identify the user-preferred region based on user preference.

When a size of the identified user-preferred region is insufficient to display the at least one GUI element, the controller according to an exemplary embodiment may display a group object corresponding to the at least one GUI element in the user-preferred region, and display the at least one GUI element corresponding to the group object in response to an input of selecting the group object.

According to an exemplary embodiment, the user-preferred region may be a range in which the electronic device is operated by one hand of the user.

According to an exemplary embodiment, the at least one GUI element displayed in the user-preferred region may include an icon for an event notification.

According to an exemplary embodiment, the display may extend to one or more edges of the electronic device, and the controller may identify the user-preferred region including a display region arranged on the one or more edges.

According to an aspect of an exemplary embodiment, there is provided a method of operating an electronic device including identifying a user-preferred region of a user on a display of the electronic device, and displaying at least one graphical user interface (GUI) element in the user-preferred region.

According to an aspect of an exemplary embodiment, there is provided an electronic device including a display; and a controller configured to determine a region of the display reachable by a hand of a user while the hand of the user grasps the electronic device and control the display to display an icon within the region based on a result of the determination.

According to an aspect of an exemplary embodiment, the electronic device may include a sensor configured to sense the hand of the user that grasps the electronic device, and the controller may determine the region based on the hand sensed by the sensor.

According to an aspect of an exemplary embodiment, the electronic device may include an orientation sensor configured to detect an orientation of the electronic device, and the controller may determine the region based on the orientation detected by the orientation sensor.

According to an aspect of an exemplary embodiment, the orientation may comprise one of a vertical orientation and a horizontal orientation.

Additional aspects will be set forth in part in the description which follows and, in part, will be apparent from the description, or may be learned by practice of the presented embodiments.

BRIEF DESCRIPTION OF THE DRAWINGS

The above and other aspects will become apparent and more readily appreciated from the following description of the exemplary embodiments, taken in conjunction with the accompanying drawings in which:

FIG. 21 is a reference view illustrating a method of configuring a user-preferred region according to an exemplary embodiment;

FIG. 24 is a flowchart of a method of displaying at least one GUI element in a user-preferred region according to an exemplary embodiment;

DETAILED DESCRIPTION OF EXEMPLARY EMBODIMENTS

Figure 1:
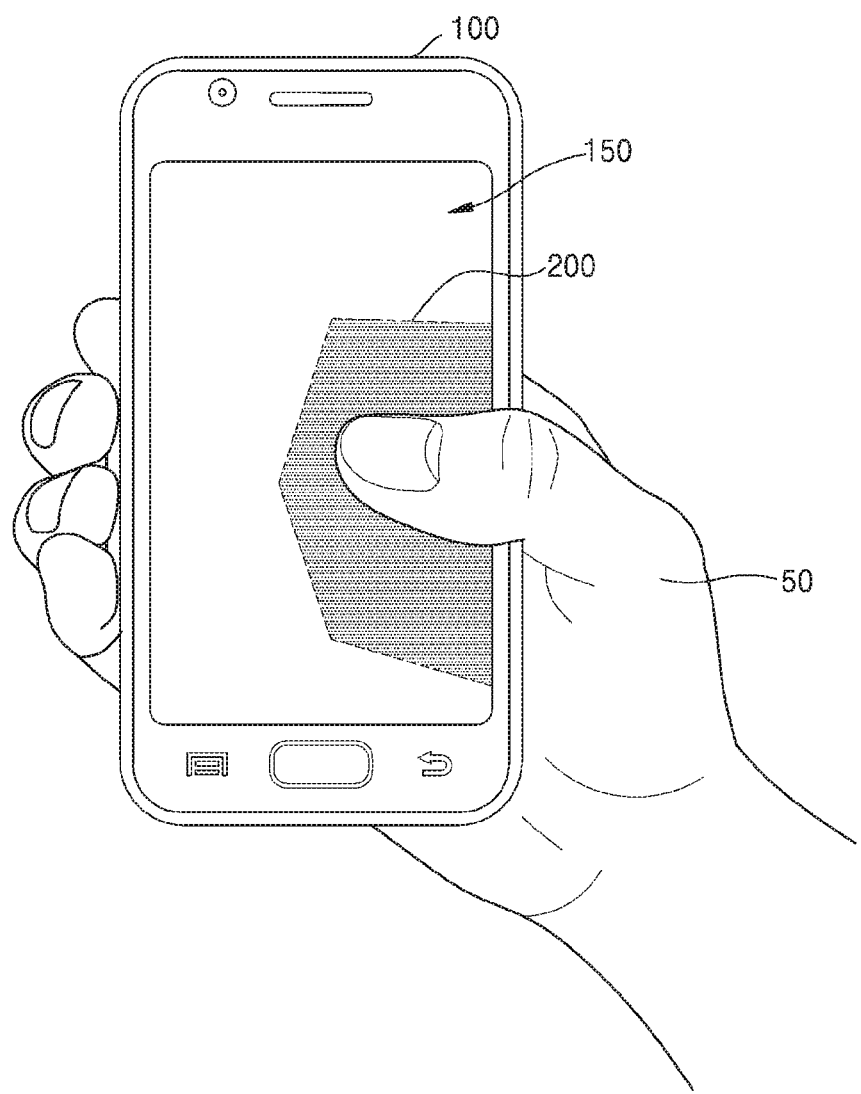
FIG. 1 is a reference view illustrating a concept of the present disclosure according to an exemplary embodiment.

Hereinafter, exemplary embodiments of the present disclosure will be described in detail with reference to the accompanying drawings. Throughout the drawings, like reference numerals refer to like parts or elements which perform substantially the same functions.

Terms including ordinal numbers, such as "first," "second," etc., may be used to represent various elements, but do not limit the corresponding elements. The terms are only used for distinguishing one element from another element. For example, a first element may also be called a second element, and similarly, the second element may also be called the first element without departing from the scope of the present disclosure. The term "and/or" includes any or all combinations of a plurality of associated items. Expressions such as "at least one of," when preceding a list of elements, modify the entire list of elements and do not modify the individual elements of the list.

Content may include a video, an image, text, or a web document.

A portion of a display in which content is actually output in an electronic device may be referred to as a screen.

The terminology used herein is for the purpose of describing embodiments only, and is not intended to limit the scope of the present disclosure. The singular forms "a," "an," and "the" include plural referents unless the context clearly indicates otherwise. It will be further understood that the terms "include," "including," "have," and/or "having" when used herein, specify the presence of stated features, integers, steps, operations, elements, parts, and/or combinations thereof, but do not preclude the presence or addition of one or more other features, integers, steps, operations, elements, parts, and/or combinations thereof.

Exemplary embodiments will be described below with reference to the drawings.

FIG. 1 is a reference view illustrating a concept of the present disclosure according to an exemplary embodiment.

FIG. 1 schematically illustrates a preferred region 200 within a display region 150 of an electronic device 100 according to an exemplary embodiment when the electronic device 100 is operated with one hand. In FIG. 1, the preferred region 200 is shown as a shaded region in the display region 150.

In an exemplary embodiment, when a user operates the electronic device 100 with one hand 50 as shown in FIG. 1, the preferred region 200 may be a region preferred by the user.

In an exemplary embodiment, the preferred region 200 may be a region within a range in which the user may operate the electronic device 100 with one hand. Thus, preferred region 200 may approximate the reach of the thumb of the hand 50 of the user on the display region 150 based on the physical dimensions (e.g., thumb length, thumbprint surface size, etc.) and characteristics (e.g., flexibility, dexterity, etc.) of the hand 50.

According to an exemplary embodiment, the electronic device 100 may display a graphical user interface (GUI) element in a user-preferred region adaptively determined according to a preference of the user. Thereby, the display of the GUI element may not be fixed to a single location on the display region 150.

The embodiment in FIG. 1 is described with regard to operation with one hand, but the same principle may be applied to operation with both hands in other embodiments. For example, while holding one side of a tablet or other device having a display of relatively large size with one hand, the user may swipe the touch screen with both thumbs. In this case, a region that each thumb of the user reaches may be determined as a preferred region.

An electronic device according to exemplary embodiments may be a device having a wired or wireless communication function. For example, the electronic device may include at least one of a smart phone, a tablet PC, a mobile phone, a video phone, an e-book reader, a desktop PC, a laptop PC, a netbook computer, a personal digital assistant (PDA), a portable multimedia player (PMP), an MP3 player, a mobile medical device, a camera, and a wearable device (e.g., a head-mounted device (HMD) like electronic glasses, electronic clothing, an electronic bracelet, an electronic necklace, an electronic accessory, an electronic tattoo, or a smart watch).

According to exemplary embodiments, an electronic device may be a smart home appliance having a wired or wireless communication function. The smart home appliance may include at least one of, for example, a TV, a DVD player, an audio system, a refrigerator, an air conditioner, a vacuum cleaner, an oven, a microwave, a washing machine, an air cleaner, a set-top box, a TV box (e.g., Samsung HomeSync™, Apple TV™, or GoogleTV™), a game console, an electronic dictionary, an electronic key, a camcorder, and an electronic frame.

According to exemplary embodiments, an electronic device may include at least one of various medical devices (e.g., a magnetic resonance angiography (MRA) system, a magnetic resonance imaging (MRI) system, a computed tomography (CT) system, a scanning machine, a sonograph, etc.), a navigation device, a global positioning system (GPS) receiver, an event data recorder (EDR), a flight data recorder (FDR), a vehicle infotainment device, electronic equipment for a ship (e.g., a navigation device for a ship, a gyrocompass, etc.), avionics, a security device, a head unit for a vehicle, an industrial or household robot, an automatic teller machine (ATM) of a financial company, and a point of sale (POS) terminal of a store.

An electronic device according to exemplary embodiments may be one of the aforementioned devices or a combination thereof. Also, the electronic device may be a flexible device. It will be understood to those of ordinary skill that the electronic device is not limited to the aforementioned devices, but may include any electronic device having a touch screen accessed by a user grasping the electronic device and manipulating the touch screen. It will also be understood to those of ordinary skill that the preferred region 200 may be any region accessed by a user grasping the electronic device and manipulating the touch screen with any combination of fingers and thumbs of one or more hands.

Figure 2:
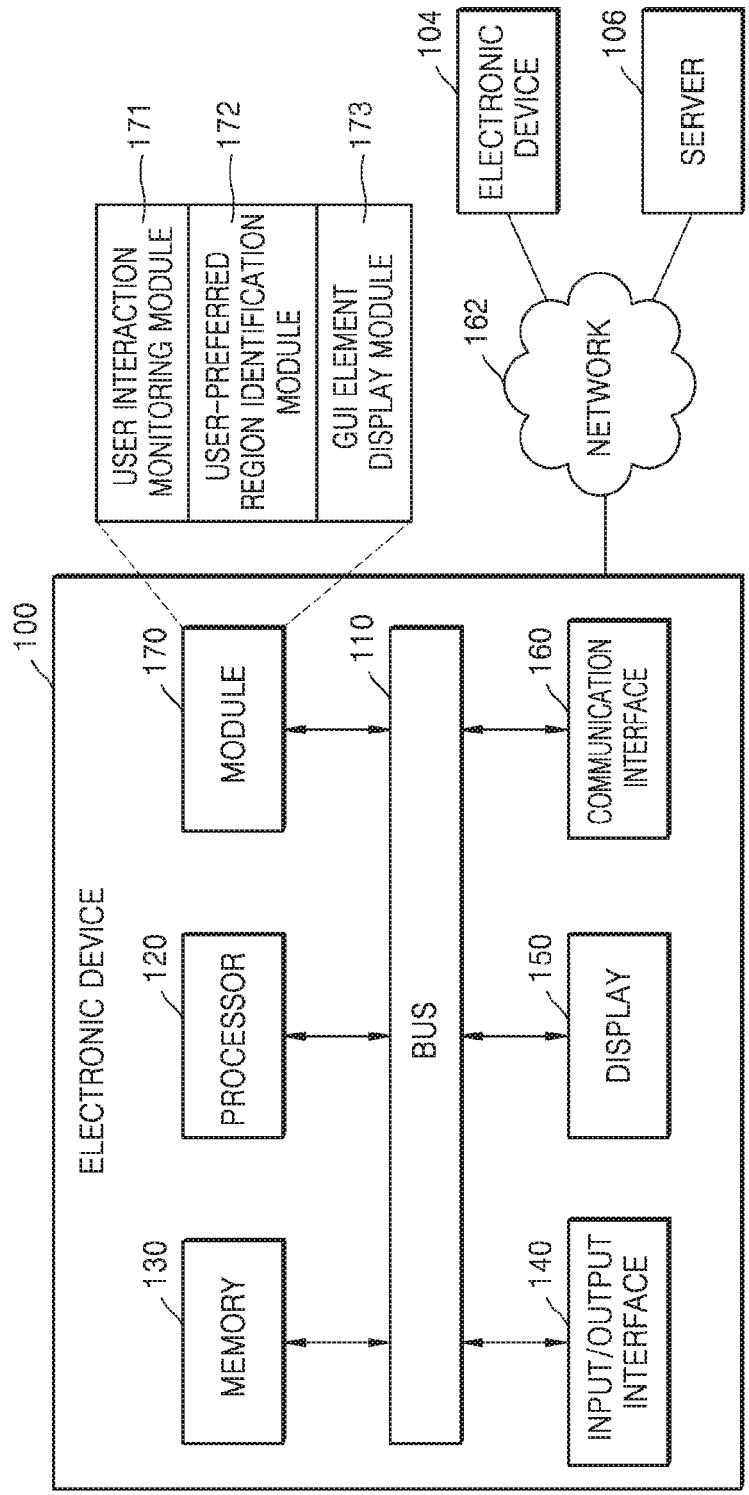
FIG. 2 is a schematic block diagram illustrating an electronic device according to an exemplary embodiment.

FIG. 2 shows a schematic block diagram illustrating of an electronic device according to an exemplary embodiment.

Referring to FIG. 2, the electronic device 100 may include a bus 110, a processor 120, a memory 130, an input/output (I/O) interface 140, a display 150, a communication interface 160, and a module 170.

The bus 110 may be communication circuitry that connects the elements of the electronic device 100 to each other and enables communication transfer (e.g., a control message) between the elements of the electronic device 100.

The memory 130 may store computer-readable instructions or data, for example received from the processor 120 or other elements (e.g., the I/O interface 140, the display 150, the communication interface 160, the module 170, etc.) or generated by the processor 120 or the other elements. The memory 130 may include software programming modules, for example, a kernel, middleware, an application programming interface (API), an application, and so on. Each of the aforementioned software programming modules may be implemented by software, firmware, hardware, or any combination thereof.

According to exemplary embodiments, the application may include a short message service (SMS)/multimedia message service (MMS) application, an e-mail application, a calendar application, an alarm application, a health care application (e.g., an application for measuring an amount of exercise, blood sugar, etc.), an environmental information application (e.g., an application for providing atmospheric pressure, humidity, temperature information, etc.), and so on. Additionally or alternatively, the application may be an application associated with information exchange between the electronic device 100 and an external electronic device (e.g., an electronic device 104). The application associated with information exchange may include, for example, a notification relay application for transferring particular information to the external electronic device or a device management application for managing the external electronic device.

The I/O interface 140 may transfer an instruction or data input from the user through an I/O device (e.g., a sensor, a keyboard, or a touch screen) to the processor 120, the memory 130, the communication interface 160, or the module 170 through, for example, the bus 110. For example, the I/O interface 140 may provide data of a touch of the user input through the touch screen to the processor 120. Also, the I/O interface 140 may output an instruction or data received from the processor 120, the memory 130, the communication interface 160, or the module 170 through, for example, the bus 110 to the I/O device (e.g., a speaker or a display). For example, the I/O interface 140 may output voice data processed through the processor 120 to the user through the speaker.

The display 150 may display various types of information (e.g., multimedia data, text data, etc.) to the user.

The communication interface 160 may connect communication between the electronic device 100 and an external device (e.g., the electronic device 104 or a server 106). For example, the communication interface 160 may be connected to a network 162 through wireless communication or wired communication and communicate with the (external) electronic device 104. The wireless communication may include at least one of, for example, wireless fidelity (WiFi), Bluetooth (BT), near field communication (NFC), the global positioning system (GPS), or cellular communication (e.g., Long-Term Evolution (LTE), LTE-Advanced (LTE-A), code division multiple access (CDMA), wideband CDMA (WCDMA), universal mobile telecommunications system (UMTS), wireless broadband (WiBro), global system for mobile communications (GSM), etc.). The wired communication may include at least one of, for example, universal serial bus (USB) communication, high definition multimedia interface (HDMI) communication, recommended standard 232 (RS-232) communication, and plain old telephone service (POTS) communication.

According to an exemplary embodiment, the network 162 may be a telecommunications network. The telecommunications network 162 may include at least one of a computer network, the Internet, the Internet of things (IOT), and a telephone network. According to an exemplary embodiment, a protocol (e.g., a transport layer protocol, a data link layer protocol, or a physical layer protocol) for communication between the electronic device 100 and the (external) electronic device 104 may be supported by at least one of the application, the API, the middleware, the kernel, and the communication interface 160.

The processor 120 may receive an instruction from the aforementioned elements (e.g., the memory 130, the I/O interface 140, the display 150, the communication interface 160, the module 170, etc.) through, for example, the bus 110, interpret the received instruction, and perform calculation or data processing according to the interpreted instruction.

According to an exemplary embodiment, the processor 120 may identify a user-preferred region preferred by the user, and control the display 150 to display at least one GUI element in the identified user-preferred region. The user-preferred region may be within a range in which the electronic device 100 may be operated with one hand of the user. The at least one GUI element displayed in the user-preferred region may include an application or an event icon or event message for event notification.

According to an exemplary embodiment, the processor 120 may detect an orientation (e.g., horizontal, vertical) of the electronic device 100, and identify the user-preferred region in consideration of the detected orientation.

According to an exemplary embodiment, the processor 120 may detect a hand of the user with which the electronic device 100 is used, and identify the user-preferred region in consideration of the detected hand.

According to an exemplary embodiment, the processor 120 may monitor an interaction between the user and the electronic device 100, and identify the user-preferred region based on at least one display region determined according to interaction between the display region and the hand or finger of the user.

According to an exemplary embodiment, the processor 120 may determine the user-preferred region for particular applications executed on the electronic device 100 by monitoring the interaction between the user and the electronic device 100 executing the application.

According to an exemplary embodiment, the processor 120 may identify and configure the user-preferred region based on a user preference.

According to an exemplary embodiment, when a size of the identified user-preferred region is insufficient to display the at least one GUI element, the processor 120 may display a group object corresponding to the at least one GUI element in the user-preferred region, and display the at least one GUI element corresponding to the group object in response to an input of selecting the group object.

According to an exemplary embodiment, when the display 150 extends to one or more edges of the electronic device 100, the processor 120 may identify the user-preferred region including a display region arranged at the one or more edges of the display 150.

The module 170 may process at least a part of information acquired from the other elements (e.g., the processor 120, the memory 130, the I/O interface 140, the communication interface 160, etc.) and provide the processed information to the user in various ways. For example, the module 170 may control at least some functions of the electronic device 100 using the processor 120 or execute additional functions independently from the processor 120. For example, the module 170 may be an audio processor, a video processor (e.g., graphics processing unit), or an audio/video encoder/decoder.

According to an exemplary embodiment, the module 170 may include a user interaction monitoring module 171, a user-preferred region identification module 172, and a GUI element display module 173.

The user interaction monitoring module 171 may monitor interactions between the user and the electronic device 100, determine display regions in the electronic device 100 in which many interactions occur between the user and the electronic device 100, and determine one or more of the display regions as the user-preferred region.

The user interaction monitoring module 171 may monitor only interactions for an application with a high degree of freedom in the user's input (i.e., high input flexibility). For example, an interaction between the user and the electronic device 100 for an application with no degree of freedom in user input may be excluded from monitoring (i.e., low input flexibility).

The user-preferred region identification module 172 determines the user-preferred region in the electronic device 100 in which a GUI element will be displayed. The user-preferred region identification module 172 may determine the user-preferred region by considering at least one of an orientation of the electronic device 100, a hand of the user with which the electronic device 100 is used, a user preference, the frequency of use of the display region determined by the user interaction monitoring module 171, and a position of a finger or thumb of the user that interacts with the electronic device 100.

The GUI element display module 173 may display a GUI element in the identified user-preferred region.

Figure 3:
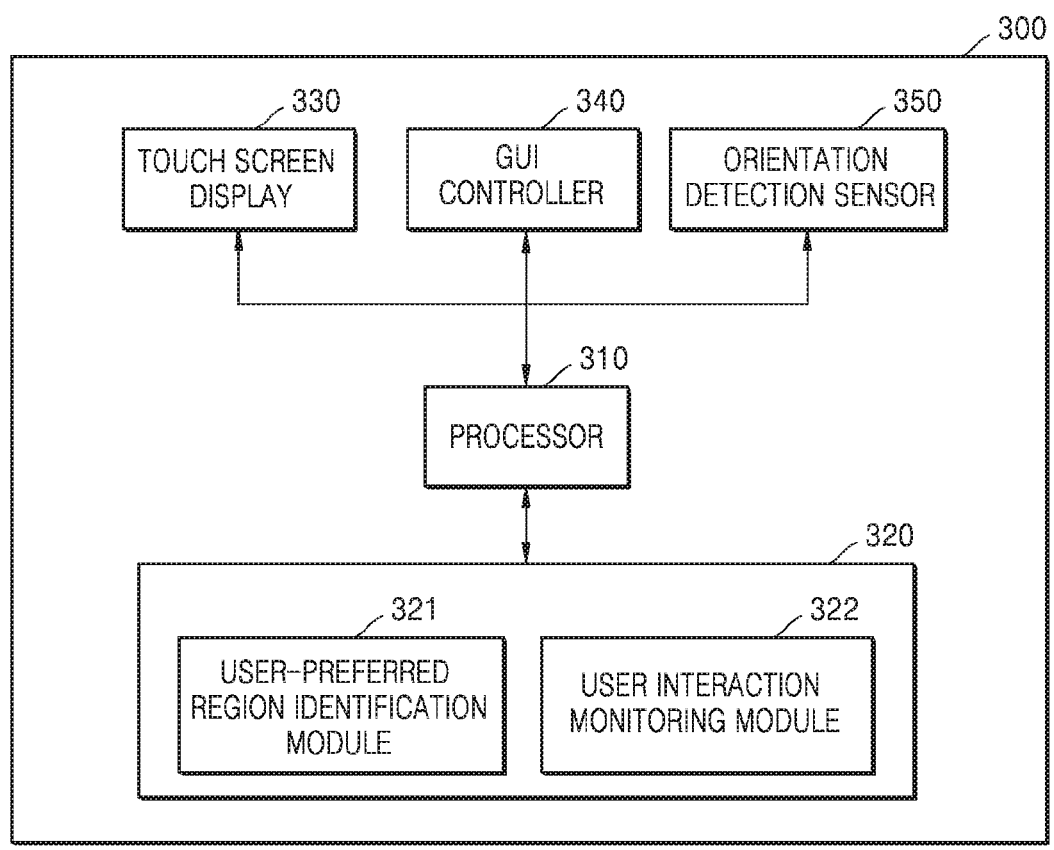
FIG. 3 is a schematic block diagram illustrating an electronic device according to an exemplary embodiment.

FIG. 3 is a schematic block diagram illustrating an electronic device according to an exemplary embodiment.

The electronic device 300 displays a GUI element on a touch screen display.

The electronic device 300 includes a processor 310 and a memory 320 having the form of a computer-readable storage medium.

The memory 320 stores computer-executable program codes for a user-preferred region identification module 321 and a user interaction monitoring module 322. The user-preferred region identification module 321 may be configured to identify a preferred region using a method described herein (e.g., identify the preferred region based on a machine learning algorithm or user preference).

The electronic device 300 further includes a GUI controller 340, an orientation detection sensor 350 that detects an orientation of the electronic device 300, and a touch screen display 330. The GUI controller 340 may control the touch screen display 330 to display various GUI elements.

In the exemplary embodiment, the user interaction monitoring module 322 is configured to monitor interactions between a current user and the touch screen, and store information that defines one or more screen regions with which the user frequently interacts during an operation. The user interaction monitoring module 322 may monitor interactions when the electronic device 300 executes an application having at least one degree of freedom with respect to user input.

The user-preferred region identification module 321 is configured to identify the user-preferred region based on the information stored in the user interaction monitoring module 322. In exemplary embodiments, the user interaction monitoring module 322 may store coordinates of a touch event during a particular time period (e.g., one day, one week, one month, etc.) or coordinates of a particular number of touch events, for example, the most recent touch events.

Subsequently, the user-preferred region identification module 321 may identify the preferred region in various ways, such as determining a boundary of a region covering a certain percentage of the stored touch events. Alternatively, a machine learning algorithm may be used. The machine learning algorithm may receive various inputs (e.g., a contact area between the user's finger and the touch screen, a duration of a particular touch event, a speed of a particular gesture, an entire display region, a region preferred as an arbitrary initial default, etc., but inputs are not limited thereto).

In another approach, in some implementation examples, coordinates of individual touch events may not be stored, but an interaction history of the current user may be stored as a hit map or a density map. In such maps, when there are many interactions of the user, scores indicating large numbers of touch events in regions are allocated to different regions in the touch screen.

In some implementation examples, the user interaction monitoring module 322 is configured to monitor only interactions with the touch screen display 330 for one or more applications. For example, only interactions during execution of an application with a high degree of freedom may be taken into consideration when the boundary of the preferred region is determined. In this way, for example, because touch of a particular icon is necessary to launch execution of a particular application, distortion of the preferred region by a touch event, in which an interaction between the user and the display screen is limited to a particular region, may be prevented. An example of an application with a high degree of freedom of user input is a photo gallery application in which the user may swipe to the left or right to see an image other than a current image in a photo column, and in which a height on a screen at which a swipe gesture is made and a start point and an end point of the gesture are freely selectable. Other types of interactions allowing a high degree of freedom are a pinch-to-zoom function, scrolling up/down in a document or a web page, and up/down/left/right swiping for access from an application menu to an adjustment screen.

In an exemplary embodiment, the user interaction monitoring module 322 may be omitted, for example, when the preferred region is identified based on user preference, and not based on previous interactions between the touch screen display 330 and the user.

Figure 4:
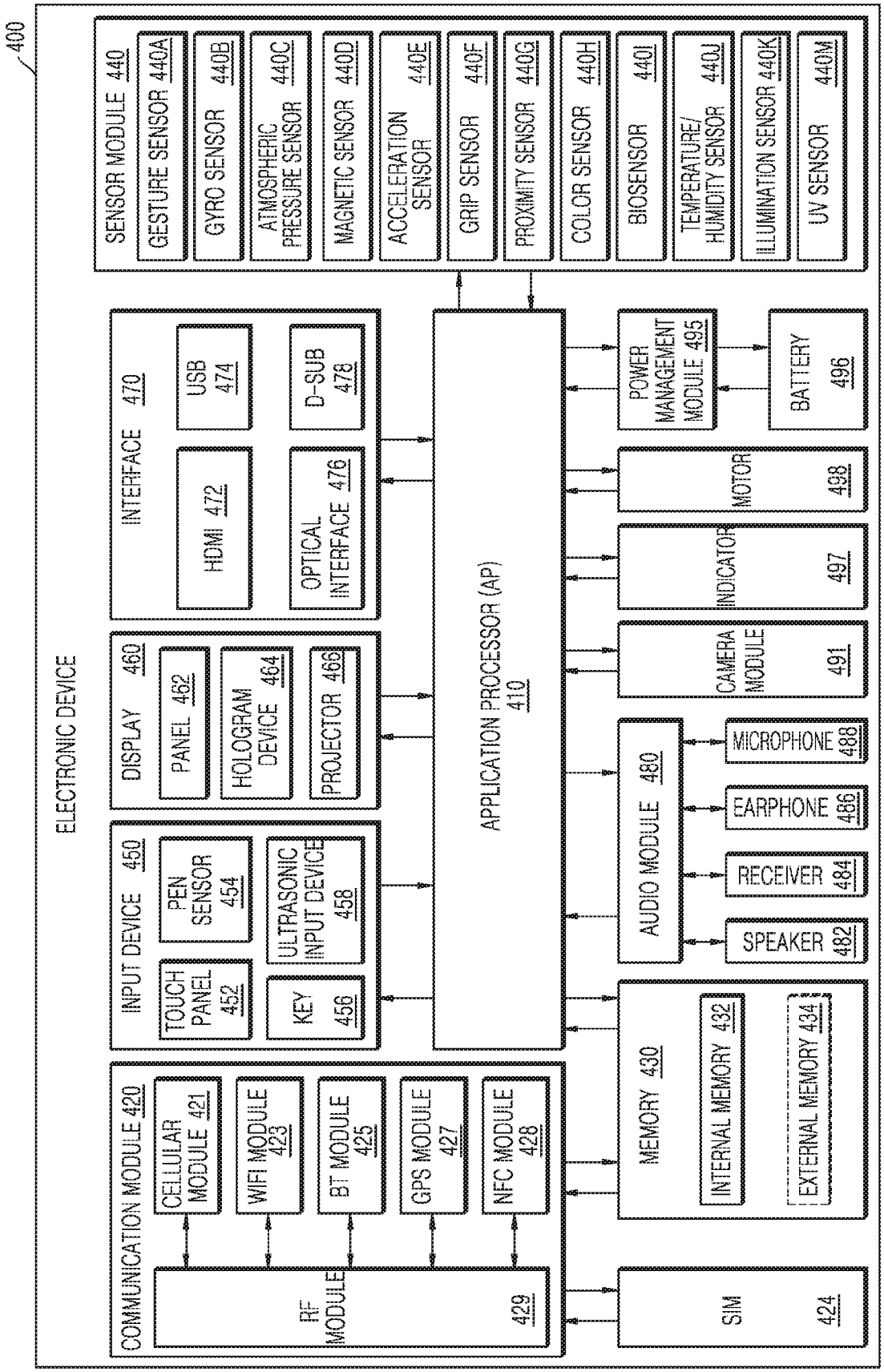
FIG. 4 is a schematic block diagram illustrating an electronic device according to an exemplary embodiment.

FIG. 4 is a schematic block diagram illustrating an electronic device according to an exemplary embodiment.

Electronic device 400 may constitute, for example, a whole or a part of the electronic device of FIG. 2 or FIG. 3.

Referring to FIG. 4, the electronic device 400 may include at least one application processor (AP) 410, a communication module 420, a subscriber identification module (SIM) card 424, a memory 430, a sensor module 440, an input device 450, a display 460, an interface 470, an audio module 480, a camera module 491, a power management module 495, a battery 496, and a motor 498.

By executing, for example, an operating system (OS) or an application program, the AP 410 may control hardware or software elements of the electronic device 400 and process and calculate various types of data including multimedia data. The AP 410 may be implemented as, for example, a system on chip (SoC). According to an exemplary embodiment, the AP 410 may further include a graphics processing unit (GPU).

The communication module 420 (e.g., the communication interface 160) may perform data transmission and reception over a communication network to which the electronic device 400 and other electronic devices are connected. According to an exemplary embodiment, the communication module 420 may include a cellular module 421, a WiFi module 423, a BT module 425, a GPS module 427, an NFC module 428, and a radio frequency (RF) module 429.

The cellular module 421 may provide a voice call service, a video call service, an SMS, an Internet service, etc. through a communication network (e.g., LTE, LTE-A, CDMA, WCDMA, UMTS, WiBro, GSM, etc.). Also, the cellular module 421 may identify and authenticate the electronic device 400 using, for example, a SIM (e.g., the SIM card 424) in the communication network. According to an exemplary embodiment, the cellular module 421 may perform at least some of functions provided by the AP 410. For example, the cellular module 421 may perform at least some multimedia control functions.

According to an exemplary embodiment, the cellular module 421 may include a communication processor (CP). Also, the cellular module 421 may be implemented as, for example, an SoC. In FIG. 4, the cellular module 421 (e.g., the CP), the memory 430, the power management module 495, etc. are shown as elements separate from the AP 410. However, according to an exemplary embodiment, the AP 410 may be implemented to include at least some (e.g., the cellular module 421) of the aforementioned elements.

According to an exemplary embodiment, the AP 410 or the cellular module 421 (e.g., the CP) may load an instruction or data received from a non-volatile memory connected thereto or at least one of other elements into a volatile memory and process the loaded instruction or data. Also, the AP 410 or the cellular module 421 may store data received from at least one of the other elements or generated by at least one of the other elements in a non-volatile memory.

Each of the WiFi module 423, the BT module 425, the GPS module 427, and the NFC module 428 may include, for example, a processor for processing data transceived through the corresponding module. In FIG. 4, the cellular module 421, the WiFi module 423, the BT module 425, the GPS module 427, and the NFC module 428 are shown as separate blocks, but according to an exemplary embodiment, at least some (e.g., two or more) of the cellular module 421, the WiFi module 423, the BT module 425, the GPS module 427, and the NFC module 428 may be included in one integrated chip (IC) or IC package. For example, at least some of the processors (e.g., a communication processor corresponding to the cellular module 421 and a WiFi processor corresponding to the WiFi module 423) corresponding to the cellular module 421, the WiFi module 423, the BT module 425, the GPS module 427, and the NFC module 428 may be implemented as one SoC.

The RF module 429 may transceive data, for example, RF signals. The RF module 429 may include, for example, a transceiver, a power amp module (PAM), a frequency filter, a low noise amplifier (LNA), and so on. Also, the RF module 429 may further include a part for transceiving electromagnetic waves for wireless communication in free space, for example, a conductor, a conducting wire, and so on. In FIG. 4, the cellular module 421, the WiFi module 423, the BT module 425, the GPS module 427, and the NFC module 428 share the RF module 429 with each other, but according to one embodiment, at least one of the cellular module 421, the WiFi module 423, the BT module 425, the GPS module 427, and the NFC module 428 may transceive RF signals through a separate RF module.

The SIM card 424 may be a card including a SIM and inserted in a slot on the electronic device 400 that is configured to receive the SIM card 424 and access the SIM card 424. The SIM card 424 may include unique identification information (e.g., an integrated circuit card identifier (ICCID)) or subscriber information (e.g., international mobile subscriber identity (MI)).

The memory 430 (e.g., the memory 130) may include an internal memory 432 or an external memory 434. The internal memory 432 may include at least one of, for example, a volatile memory (e.g., a dynamic random access memory (DRAM), a static RAM (SRAM), a synchronous dynamic RAM (SDRAM), etc.), and a non-volatile memory (e.g., a one-time programmable read-only memory (OTPROM), a programmable ROM (PROM), an erasable and programmable ROM (EPROM), an electrically erasable and programmable ROM (EEPROM), a mask ROM, a flash ROM, a NAND flash memory, a NOR flash memory, etc.).

According to an exemplary embodiment, the internal memory 432 may be a solid state drive (SSD). The external memory 434 may further include a flash drive, for example, a compact flash (CF) memory card, a secure digital (SD) memory card, a micro-SD memory card, a mini-SD memory card, an extreme digital (XD) memory card, a memory stick, or so on. Through various interfaces, the external memory 434 may be functionally connected to the electronic device 400. According to an exemplary embodiment, the electronic device 400 may further include a storage device (or a storage medium) such as a hard disk drive.

The sensor module 440 may measure a physical quantity or sense an operational state of the electronic device 400 and convert the measured or sensed information into an electric signal. The sensor module 440 may include at least one of, for example, a gesture sensor 440A, a gyro sensor 440B, an atmospheric pressure sensor 440C, a magnetic sensor 440D, an acceleration sensor 440E, a grip sensor 440F, a proximity sensor 440G, a color sensor 440H (e.g., a red, green, blue (RGB) sensor), a biosensor 440I, a temperature/humidity sensor 440J, an illumination sensor 440K, and an ultraviolet (UV) sensor 440M. Additionally or alternatively, the sensor module 440 may include, for example, an e-nose sensor, an electromyography (EMG) sensor, an electroencephalogram (EEG) sensor, an electrocardiogram (ECG) sensor, an infrared (IR) sensor, an iris sensor, a fingerprint sensor, and so on. The sensor module 440 may further include a control circuit for controlling at least one sensor included therein.

The input device 450 may include a touch panel 452, a (digital) pen sensor 454, a key 456, or an ultrasonic input device 458. The touch panel 452 may recognize a touch input using at least one of, for example, capacitive, resistive, IR, and ultrasonic techniques. Also, the touch panel 452 may further include a control circuit. In the case of a capacitive type touch panel 452, a physical contact or proximity recognition is possible. The touch panel 452 may further include a tactile layer. In this case, the touch panel 452 may provide a tactile reaction to the user.

The (digital) pen sensor 454 may be implemented, for example, using a method identical or similar to receiving of a touch input of the user or using a separate recognition sheet. The key 456 may include, for example, physical buttons, optical keys, or a keypad. The ultrasonic input device 458 is a device which may sense a sonic wave generated by an input tool for generating an ultrasonic signal through a microphone (e.g., a microphone 488) and check data in the electronic device 400, and is capable of wireless recognition. According to an exemplary embodiment, the electronic device 400 may receive a user input from an external device (e.g., a computer or a server) connected thereto using the communication module 420.

The display 460 may include a panel 462, a hologram device 464, or a projector 466. The panel 462 may be, for example, a liquid crystal display (LCD), an active-matrix organic light-emitting diode (AMOLED) display, and so on. The panel 462 may be implemented to be, for example, flexible, transparent, or wearable. The panel 462 may constitute one module with the touch panel 452. The hologram device 464 may show a three-dimensional (3D) image in the air using the interference of light. The projector 466 may display an image by projecting light to a screen. The screen may be, for example, located inside or outside the electronic device 400. According to an exemplary embodiment, the display 460 may further include a control circuit for controlling the panel 462, the hologram device 464, or the projector 466.

The interface 470 may include, for example, an HDMI 472, a USB interface 474, an optical interface 476, or a D-subminiature (D-sub) 478. The interface 470 may be included in, for example, the communication interface 160 shown in FIG. 2. Additionally or alternatively, the interface 470 may include, for example, a mobile high-definition link (MHL) interface, an SD card/multimedia card (MMC) interface, or an infrared data association (IrDA) standard interface.

The audio module 480 may convert sound into an electric signal and vice versa. At least some elements of the audio module 480 may be included in, for example, the I/O interface 140 in FIG. 2. The audio module 480 may process sound information input or output through, for example, a speaker 482, a receiver 484, an earphone 486, the microphone 488, and so on.

The camera module 491 is a device capable of capturing a still image or a video. According to an exemplary embodiment, the camera module 491 may include one or more image sensors (e.g., a front sensor and a rear sensor), a lens, an image signal processor (ISP), or a flash (e.g., an LED or a xenon lamp).

The power management module 495 may manage the power of the electronic device 400. The power management module 495 may include, for example, a power management integrated circuit (PMIC), a charger IC, or a battery or fuel gauge.

The PMIC may be included in, for example, an IC or an SoC semiconductor device. Charging methods may be classified into wired charging and wireless charging. The charger IC may charge a battery and prevent inflow of an overvoltage or overcurrent from a charger. According to an exemplary embodiment, the charger IC may include a charger IC for at least one of wired charging and wireless charging. Example of wireless charging include magnetic resonance charging, magnetic induction charging, electromagnetic charging, etc., and an additional circuit, for example, a coil loop, a resonance circuit, a rectifier, etc., for wireless charging may be added.

The battery gauge may measure, for example, the residual power, charging voltage, current, or temperature of the battery 496. The battery 496 may store or generate electricity and supply power to the electronic device 400 using the stored or generated electricity. The battery 496 may include a rechargeable battery or a solar battery.

The indicator 497 may display a particular state, for example, a booting state, a message state, a charging state, etc., of the electronic device 400 or a part (e.g., the AP 410) of the electronic device 400. The motor 498 may convert an electric signal into mechanical vibration.

The electronic device 400 may include a processing device (e.g., a GPU) for supporting a mobile TV. The processing device for supporting a mobile TV may process media data conforming to a standard, such as digital multimedia broadcasting (DMB), digital video broadcasting (DVB), media flow, and so on.

Each of the above-described elements of the electronic device 100, 300, 400 may be formed of one or more components, and the name of the corresponding element may vary according to the type of the electronic device. The electronic device 100, 300, 400 may include at least one of the elements described above, and may exclude some of the elements or further include other additional elements. Some of the elements of the electronic device 100, 300, 400 may be combined into one entity and perform the same functions as those of the elements before the combination.

Figure 5:
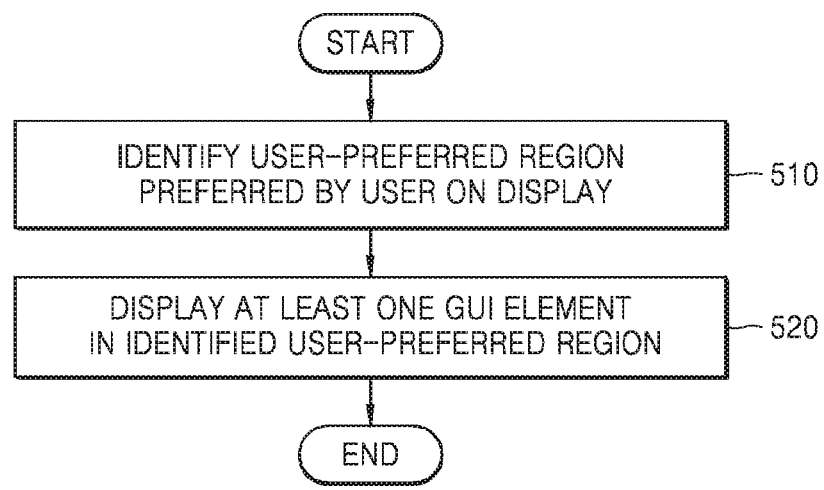
FIG. 5 is a flowchart illustrating an example of a method of operating an electronic device according to an exemplary embodiment.

FIG. 5 is a flowchart illustrating an example of a method of operating an electronic device according to an exemplary embodiment.

Referring to FIG. 5, in operation 510, an electronic device identifies a user-preferred region on a display thereof that is preferred by a user.

The user-preferred region may refer to a region one or more of the user's hands engage when the user interfaces with the electronic device with one hand or both hands. For example, when the user performs an action other than manipulation of the electronic device with his or her left hand and manipulates the electronic device with his or her right hand, it may be necessary for the user to manipulate a display region of the electronic device with fingers of his or her right hand while holding the electronic device with his or her right hand. To this end, at least one GUI element that involves an interaction, such as a touch of the user's hand, etc., for manipulation of the electronic device may be arranged in a region within a range touchable with a finger of the user's right hand. In this way, the electronic device may determine, for example, a region in a range touchable with a finger of the user's right hand as the user-preferred region.

The user-preferred region may be determined according to various methods.

The user-preferred region refers to a part of the display region currently preferred by the user of the electronic device, and may include one or more regions separated from each other. For example, when the user uses the electronic device with both hands, two or more user-preferred regions may be identified.

The user-preferred region may be flexibly changed according to a form in which the user of the electronic device uses the electronic device. For example, when the user uses the electronic device vertically and then horizontally, the electronic device may selectively determine a user-preferred region for vertical orientation use and a user-preferred region for horizontal orientation use, and such user-preferred regions may be different.

According to an exemplary embodiment, the electronic device may detect an orientation, and identify or select the user-preferred region in consideration of the detected orientation.

According to an exemplary embodiment, the electronic device may detect a hand of the user with which the electronic device is used, and identify the user-preferred region in consideration of the detected hand of the user.

According to an exemplary embodiment, the electronic device may monitor interaction between the user and the electronic device, and identify the user-preferred region based on at least one display region determined to correspond to the monitored interaction.

According to an exemplary embodiment, the electronic device may identify the user-preferred region based on user preference.

In operation 520, the electronic device displays at least one GUI element in the user-preferred region.

The GUI element may be an icon, an item, etc. displayed on a display of the electronic device and activated by the user's selection thereof. The GUI element displayed in the user-preferred region may include a notification icon that notifies the user, for example that a new e-mail or message has been received, an application icon, a menu icon that makes a change of a setting of the electronic device, a character input icon, and so on.

According to an exemplary embodiment, the electronic device may display a group object corresponding to the at least one GUI element in the user-preferred region. Displaying the group object is preferable when a size of the identified user-preferred region is insufficient to display the at least one GUI element.

According to an exemplary embodiment, in response to an input of selecting the group object, the electronic device may display the at least one GUI element corresponding to the group object.

Accordingly, a user interface that enables the user to select an option of a function of displaying the GUI element in the user-preferred region of the electronic device may be provided.

Figure 6A:
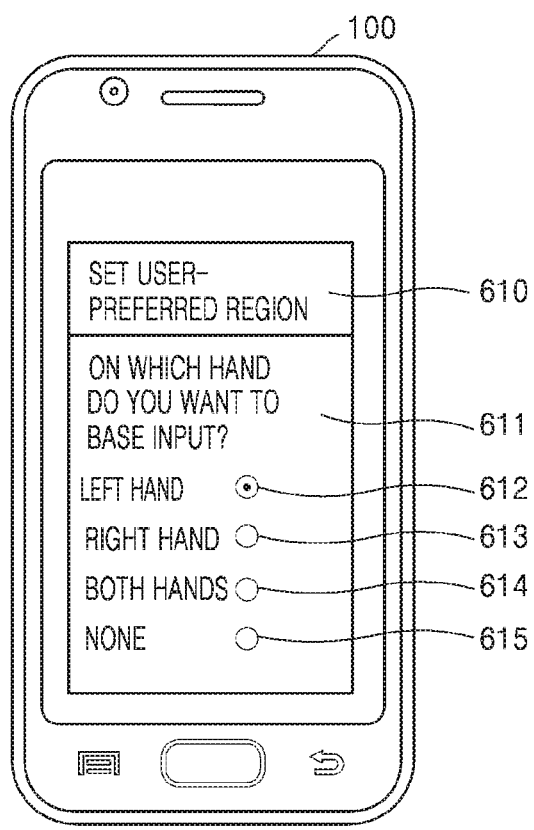
FIG. 6A illustrates an example of a user interface to configure the user interface for receiving input according to a particular hand of a user according to an exemplary embodiment.

FIG. 6A illustrates an example of a user interface to configure the user interface for receiving input according to a particular hand of a user according to an exemplary embodiment.

Referring to FIG. 6A, the electronic device 100 (or 300, 400) outputs a user interface 610 for configuring a user-preferred region on the display. The user interface 610 may include a message 611 asking the user to select the hand the user prefers as the basis for a user-preferred region, an input item 612 indicating "LEFT HAND," an input item 613 indicating "RIGHT HAND," an input item 614 indicating "BOTH HANDS," and an input item 615 indicating "NONE."

The user may select the input item 612 indicating "LEFT HAND" to configure the user-preferred region to be disposed for the left hand, select the input item 613 indicating "RIGHT HAND" to configure the user-preferred region to be disposed for the right hand, select the input item 614 indicating "BOTH HANDS" to configure the user-preferred region to be disposed for both hands, or select the input item 615 indicating "NONE" to configure the user-preferred region to be adaptively determined by the electronic device.

Figure 6B:
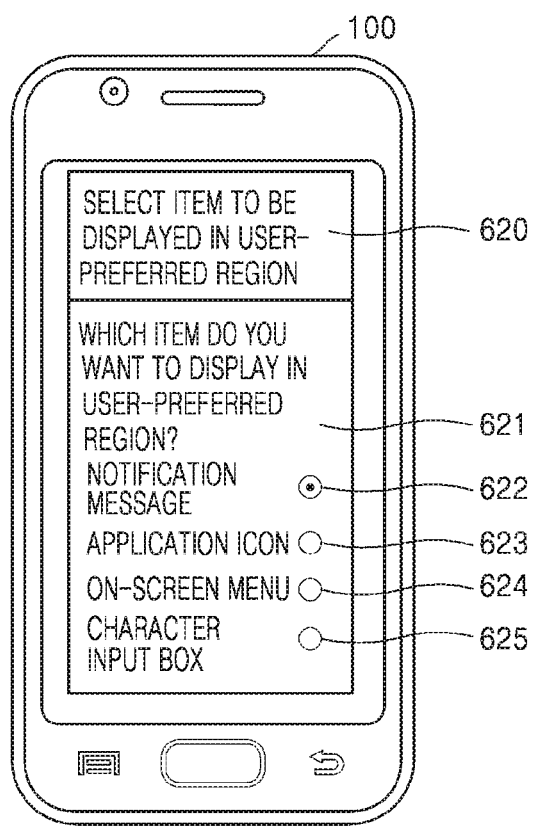
FIG. 6B illustrates an example of a user interface to configure the user interface to display selectable items in a user-preferred region according to an exemplary embodiment.

FIG. 6B illustrates an example of a user interface to configure the user interface to display selectable items in a user-preferred region according to an exemplary embodiment.

Referring to FIG. 6B, the electronic device 100 (or 300, 400) outputs a user interface 620 for selecting an item to be displayed in a user-preferred region. The user interface 620 may include a message 621 asking the user which item the user wants to display in the user-preferred region, an input item 622 indicating "NOTIFICATION MESSAGE," an input item 623 indicating "APPLICATION ICON," an input item 624 indicating "ON-SCREEN MENU," and an input item 625 indicating "CHARACTER INPUT BOX."

Items to be displayed in the user-preferred region are not limited to those shown in FIG. 6B, and the user may select one or more of the input items shown in the user interface 620. To configure that all of the items displayed in the user interface 620 shown in FIG. 6B to be displayed in the user-preferred region, the user may select all of the input items 622 to 625 displayed in the user interface 620.

Figure 7:
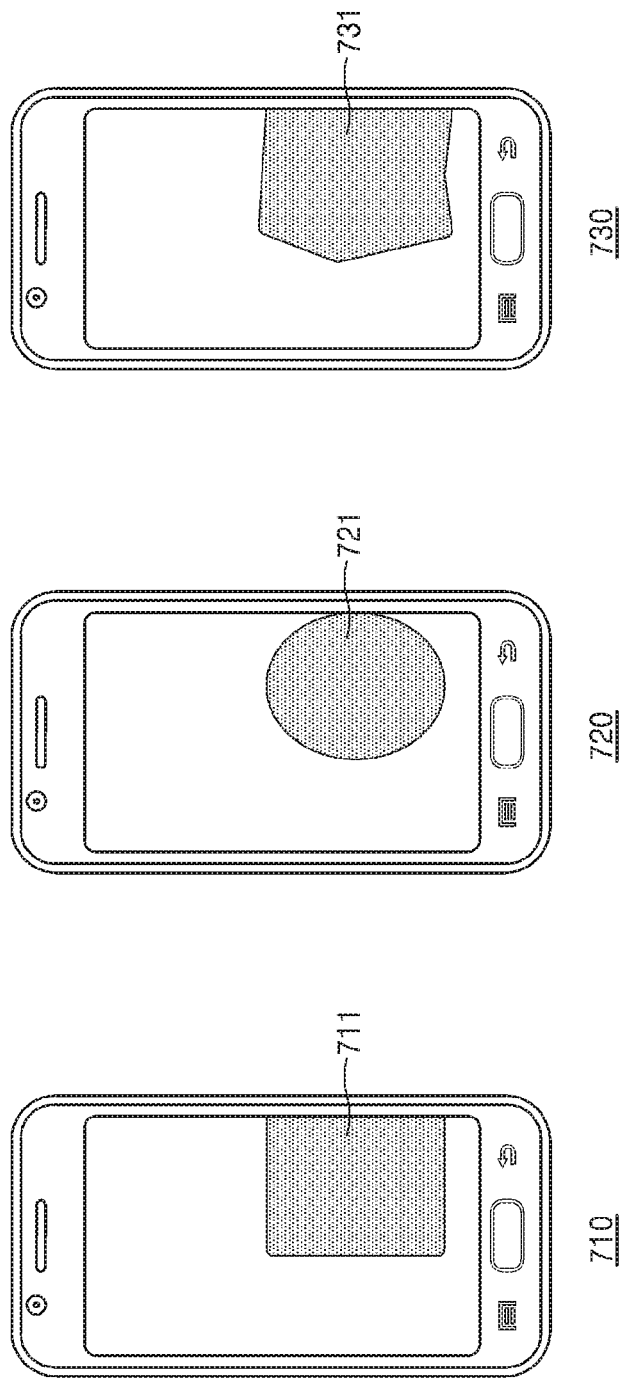
FIG. 7 illustrates examples of an electronic device configured to display selectable items in a user-preferred region according to an exemplary embodiment.

FIG. 7 illustrates examples of an electronic device configured to display selectable items in a user-preferred region according to an exemplary embodiment.

According to an exemplary embodiment, a user-preferred region may have a simple geometric shape, such as a square, a rectangle, a circle, and so on. In FIG. 7, example 710 shows that a user-preferred region 711 has a rectangular shape, and example 720 shows that a user-preferred region 721 has a circular shape.

According to an exemplary embodiment, a user-preferred region may have an irregular shape. In FIG. 7, example 730 shows that a user-preferred region 731 has an irregular shape.

According to an exemplary embodiment, one or more user-preferred regions may be disposed on a display of an electronic device.

Figure 8:
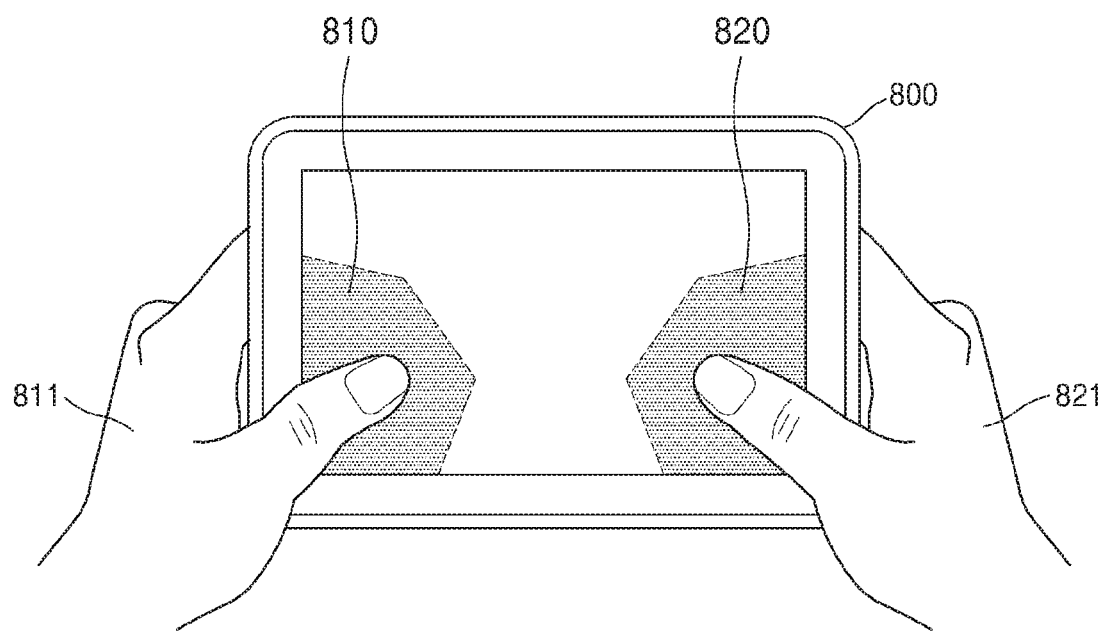
FIG. 8 shows illustrates an example configuration of two user-preferred regions configured in an electronic device according to an exemplary embodiment.

FIG. 8 illustrates an example configuration of two user-preferred regions configured in an electronic device according to an exemplary embodiment.

Referring to FIG. 8, a user holds and operates an electronic device 800 with both hands. For example, when the electronic device 800 is a large-sized electronic device such as a tablet, the user frequently manipulates the electronic device 800 with both hands because of the difficulty to simultaneously hold and manipulate the electronic device 800 with one hand. Therefore, in this case, the electronic device 800 may arrange a first user-preferred region 810 in a display region close to a left hand 811 of the user and arrange a second user-preferred region 820 in a display region close to a right hand 821 of the user. The electronic device 800 may arrange the first user-preferred region 810 and the second user-preferred region 820 as shown in FIG. 8 and display one or more GUI elements in the arranged first and second user-preferred regions 810 and 820, thereby enabling the user to conveniently select the one or more displayed GUI elements without minimal effort.

According to an exemplary embodiment, a user-preferred region may include an edge region of an electronic device including an edge display.

Figure 9:
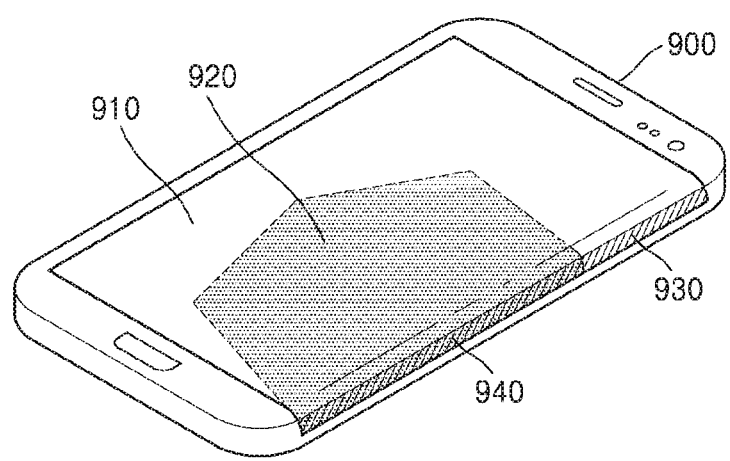
FIG. 9 is a diagram illustrating a method of operating an electronic device including an edge display according to an exemplary embodiment.

FIG. 9 is a diagram illustrating a method of operating an electronic device including an edge display according to an exemplary embodiment.

Referring to FIG. 9, the user-preferred region may also be implemented in an electronic device 900 having a curved touch screen, such as a device having a touch screen bent around an edge of the device. In this case of a touch screen 910 extending to one or more edges of the electronic device 900 as shown in FIG. 9, the electronic device 900 may configure a user-preferred region 920 to include a region 940 of the touch screen 910 arranged at one edge 930 when identifying the user-preferred region 920.

In other words, according to an exemplary embodiment, the electronic device 900 may extend the user-preferred region 920 to the edge region 940 thereof on the edge 930 of the electronic device 900.

In an exemplary embodiment, the electronic device 900 may consider a main surface and the curved edge 940 of the touch screen 910 as separate display regions, and identify one of the main surface and the curved edge 940 as a user-preferred region.

According to exemplary embodiments, various items may be displayed in a user-preferred region arranged in an electronic device.

FIGS. 10A to 10D are diagrams illustrating selectable items displayed in a user-preferred region according to an exemplary embodiment.

Figure 10A:
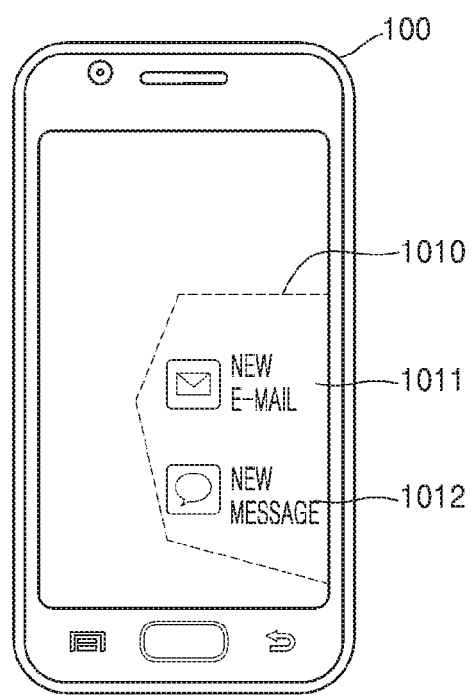
FIGS. 10A, 10B, 10C, and 10D are diagrams illustrating selectable items displayed in a user-preferred region in an electronic device according to an exemplary embodiment.

FIG. 10A shows GUI elements which represent event notifications and are displayed in an identified user-preferred region 1010 according to an exemplary embodiment.

Referring to FIG. 10A, two event notifications, that is, a GUI element 1011 representing an event notification indicating reception of a new e-mail and a GUI element 1012 representing an event notification indicating reception of a new message, are displayed in the user-preferred region 1010.

Event notifications may concern various events (e.g., an alarm or other messages generated by an application, reception of a new mail or text message, or a reminder of a calendar event). To execute an application associated with a particular type of event, the user may select the GUI element 1011 or 1012.

FIG. 10A shows only GUI elements associated with particular event notifications. However, for example, when a particular message is received, a part of content included in the newly received message may be displayed together with a GUI element corresponding to reception of the new message in the user-preferred region.

Figure 10B:
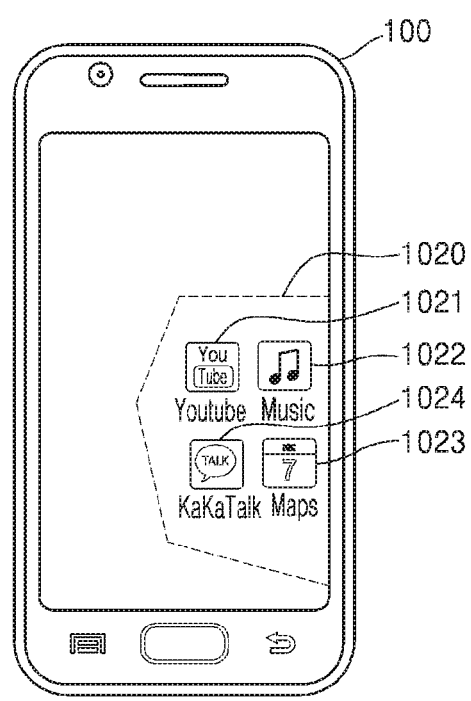

FIG. 10B shows GUI elements of applications or widgets displayed in an identified user-preferred region 1020 according to an exemplary embodiment.

Referring to FIG. 10B, four application GUI elements 1021, 1022, 1023, and 1024 are displayed in the user-preferred region 1020.

Figure 10C:
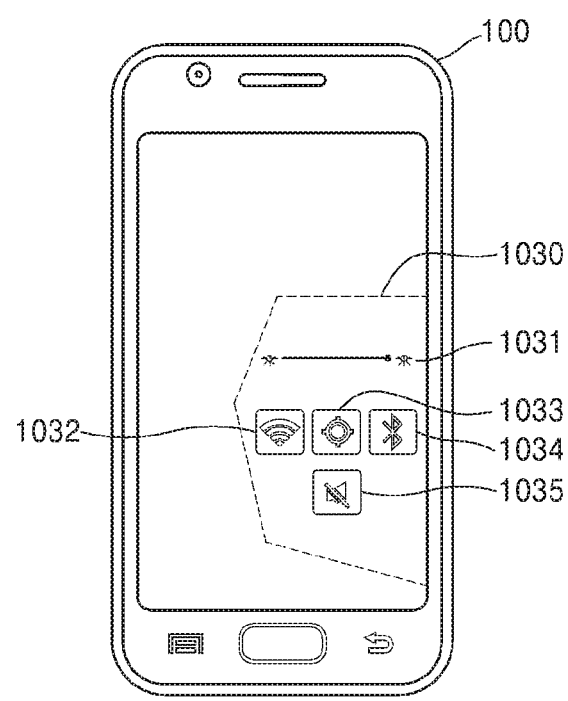

FIG. 10C shows GUI elements of on-screen menus displayed in an identified user-preferred region 1030 according to an exemplary embodiment.

Referring to FIG. 10C, GUI elements 1031, 1032, 1033, 1034, and 1035 representing five on-screen menus are displayed in the user-preferred region 1030. The on-screen menus refer to menus, etc. for changing settings of the electronic device 100, and may include, for example, a volume adjustment menu 1031, a screen brightness adjustment menu 1033, a WiFi setting menu 1032, a BT setting menu 1034, and a mute setting 1035.

Figure 10D:
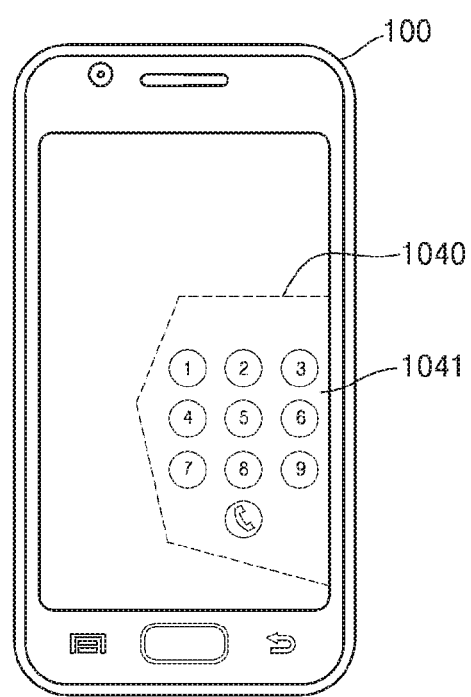

FIG. 10D shows GUI elements of a character input box displayed in an identified user-preferred region 1040 according to an exemplary embodiment.

Referring to FIG. 10D, GUI elements 1041 representing a character input box are displayed in the user-preferred region 1040. For example, when a user holds a cellular phone with one hand and executes a telephone call application to make a phone call with the same hand, a character input box may be arranged within a range touchable with the hand of the user, as shown in FIG. 10D, so the user may easily input numbers for making a phone call with only one hand.

Figure 11:
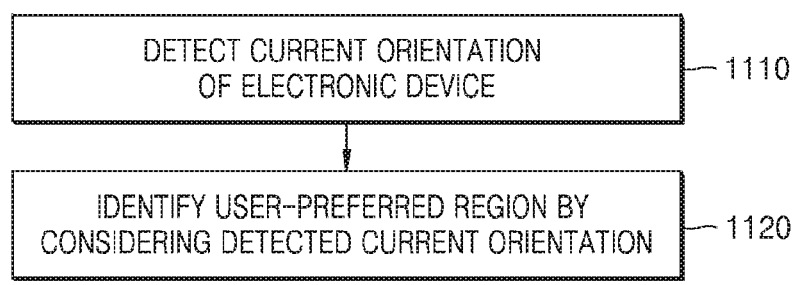
FIG. 11 is a flowchart illustrating a method of identifying a user-preferred region according to an exemplary embodiment.

FIG. 11 is a flowchart illustrating a method of identifying a user-preferred region according to an exemplary embodiment.

Referring to FIG. 11, in operation 1110, the electronic device 100 detects a current orientation thereof. For example, the electronic device 300 may detect a current orientation thereof using the orientation detection sensor 350, or the electronic device 400 may detect a current orientation thereof using the gyro sensor 440B. The current orientation represents whether the electronic device is oriented horizontally or vertically.

In operation 1120, the electronic device 100 may identify a user-preferred region in consideration of the detected orientation thereof.

When the electronic device 100 is disposed in different orientations, the electronic device 100 may use different user-preferred regions.

For example, a preferred region may vary according to whether the user holds the electronic device 100 with the longer sides of the electronic device placed in a vertical or horizontal direction.

Figure 12:
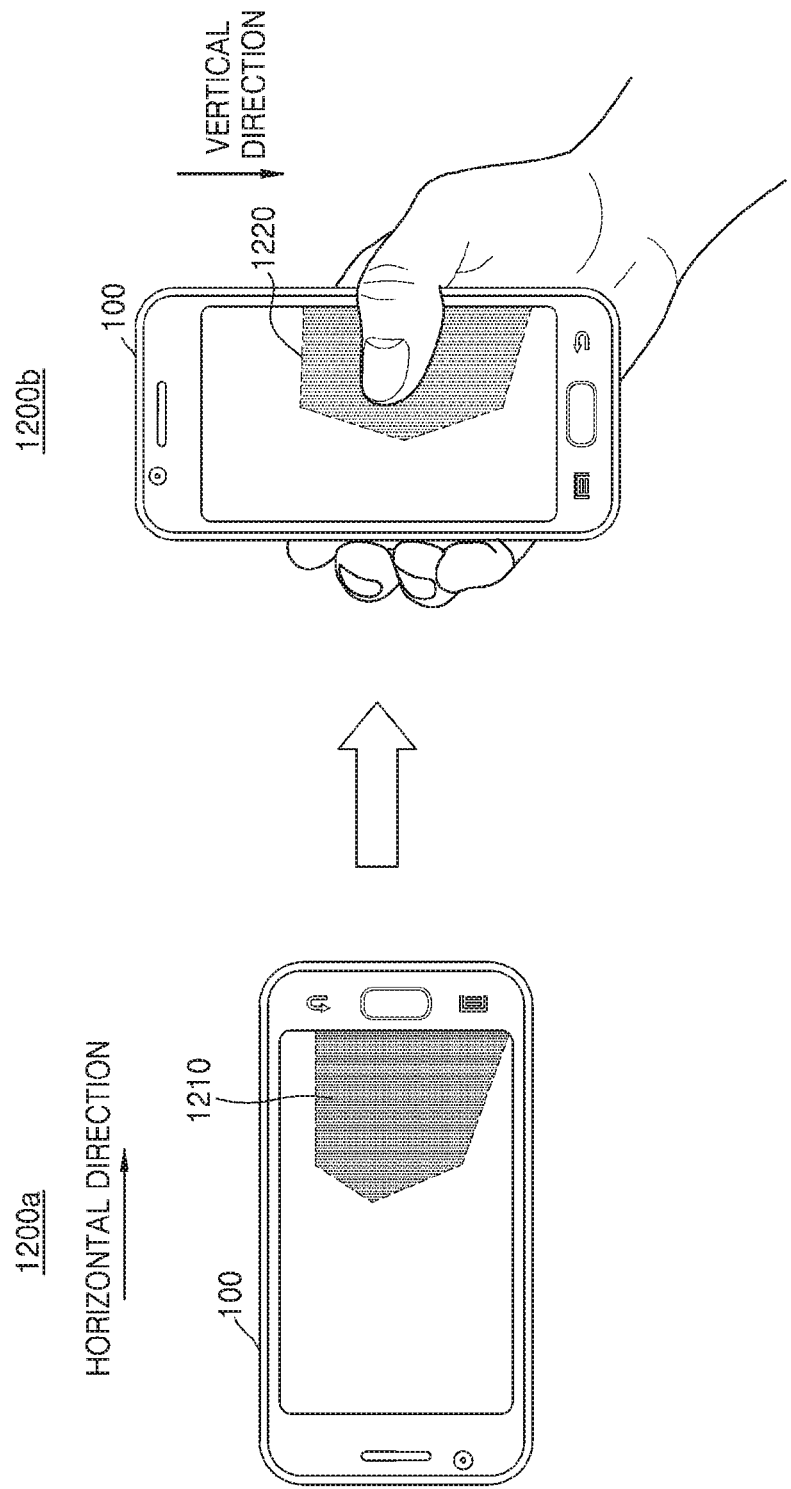
FIG. 12 is a reference view illustrating user-preferred regions selectively arranged in an electronic device depending on an orientation of the electronic device according to an exemplary embodiment.

FIG. 12 is a reference view illustrating user-preferred regions selectively arranged in an electronic device depending on an orientation of the electronic device according to an exemplary embodiment.

Referring to FIG. 12, 1200*a* shows a user-preferred region 1210 when the electronic device 100 is horizontally oriented, and 1200*b* shows a user-preferred region 1220 when the electronic device 100 is vertically oriented. The electronic device 100 detects whether the electronic device 100 is oriented horizontally or vertically and may change the position and size of a user-preferred region while maintaining the shape of the user-preferred region. Alternatively, the position, size, and shape, or any combination thereof, of the user-preferred region may be adjusted based on the orientation of the electronic device 100.

Figure 13:
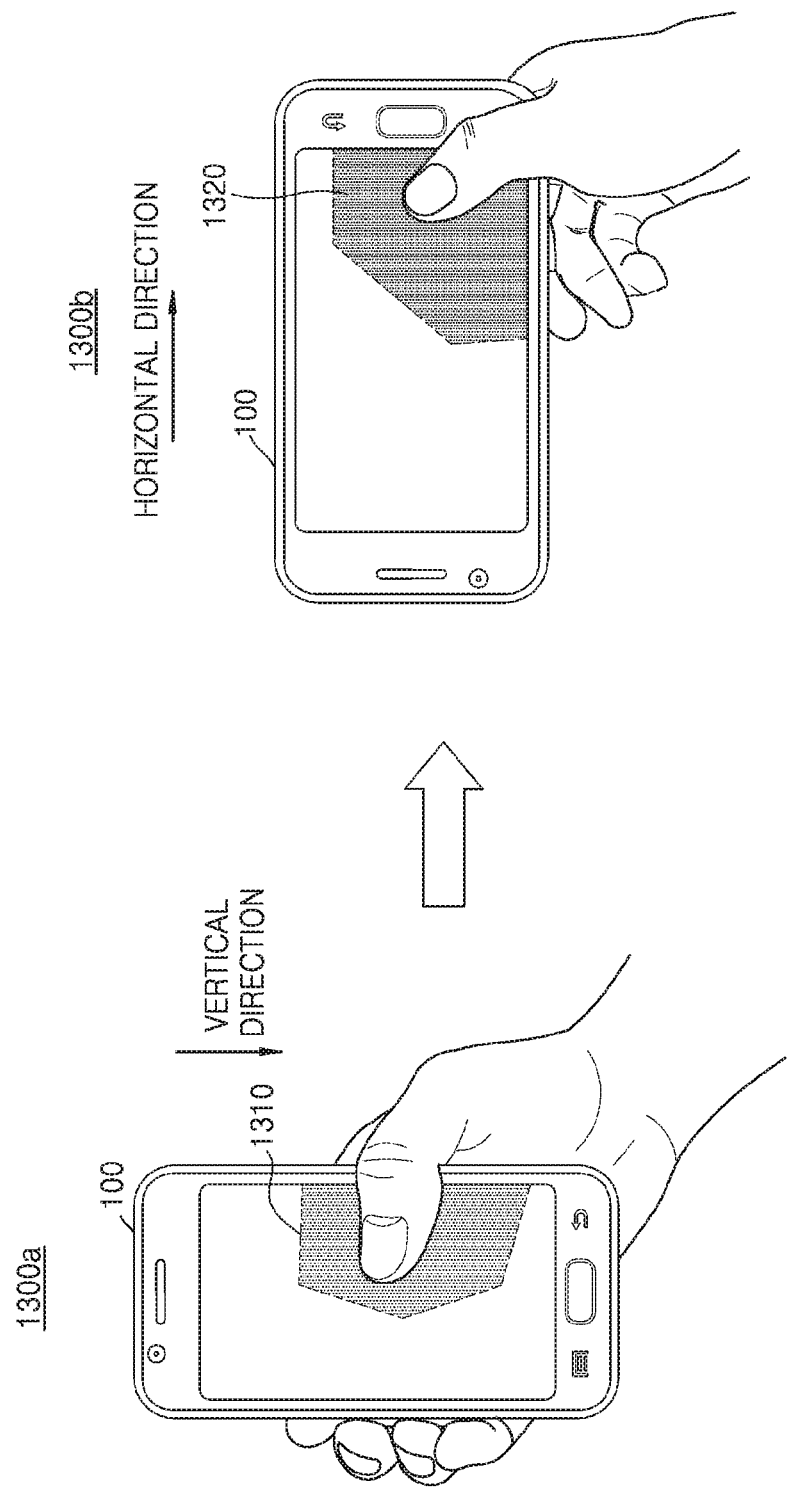
FIG. 13 is a reference view illustrating user-preferred regions selectively arranged in an electronic device depending on an orientation of the electronic device according to an exemplary embodiment.

FIG. 13 is a reference view illustrating user-preferred regions selectively arranged in an electronic device depending on an orientation of the electronic device according to an exemplary embodiment.

Referring to FIG. 13, 1300*a* shows a user-preferred region 1310 when the electronic device 100 is vertically oriented, and 1300*b* shows a user-preferred region 1320 when the electronic device 100 is horizontally oriented. The electronic device 100 detects whether the electronic device 100 is oriented horizontally or vertically and may change the position or size of a user-preferred region, as well as the shape of the user-preferred region. In this way, by adaptively changing the shape, size, or position of a user-preferred region according to whether the electronic device 100 is horizontally or vertically oriented, it is possible to adaptively provide a user-preferred region according to the user's preference for grasping the electronic device 100.

Figure 14:
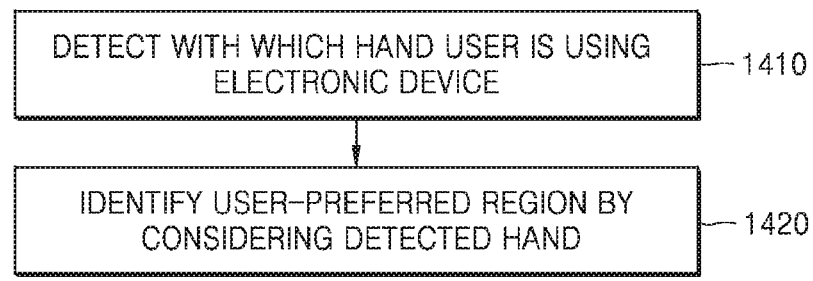
FIG. 14 is a flowchart illustrating a method of identifying a user-preferred region according to an exemplary embodiment.

FIG. 14 is a flowchart illustrating a method of identifying a user-preferred region according to an exemplary embodiment.

Referring to FIG. 14, in operation 1410, the electronic device 100 detects a hand, thumb, or fingers of the user with which the electronic device 100 is being used. For example, the electronic device 400 may detect with which hand the user is grasping the electronic device 400 using the grip sensor 440F, the proximity sensor 440G, and the temperature/humidity sensor 440J of the sensor module 440, the touch panel 452, and so on.

In operation 1420, the electronic device 100 identifies a user-preferred region in consideration of the detected hand.

The user may hold and manipulate the electronic device 100 with his or her left hand or right hand. By identifying a user-preferred region according to a hand of the user holding the electronic device 100, the electronic device 100 may provide an effective user-preferred region.

Figure 15:
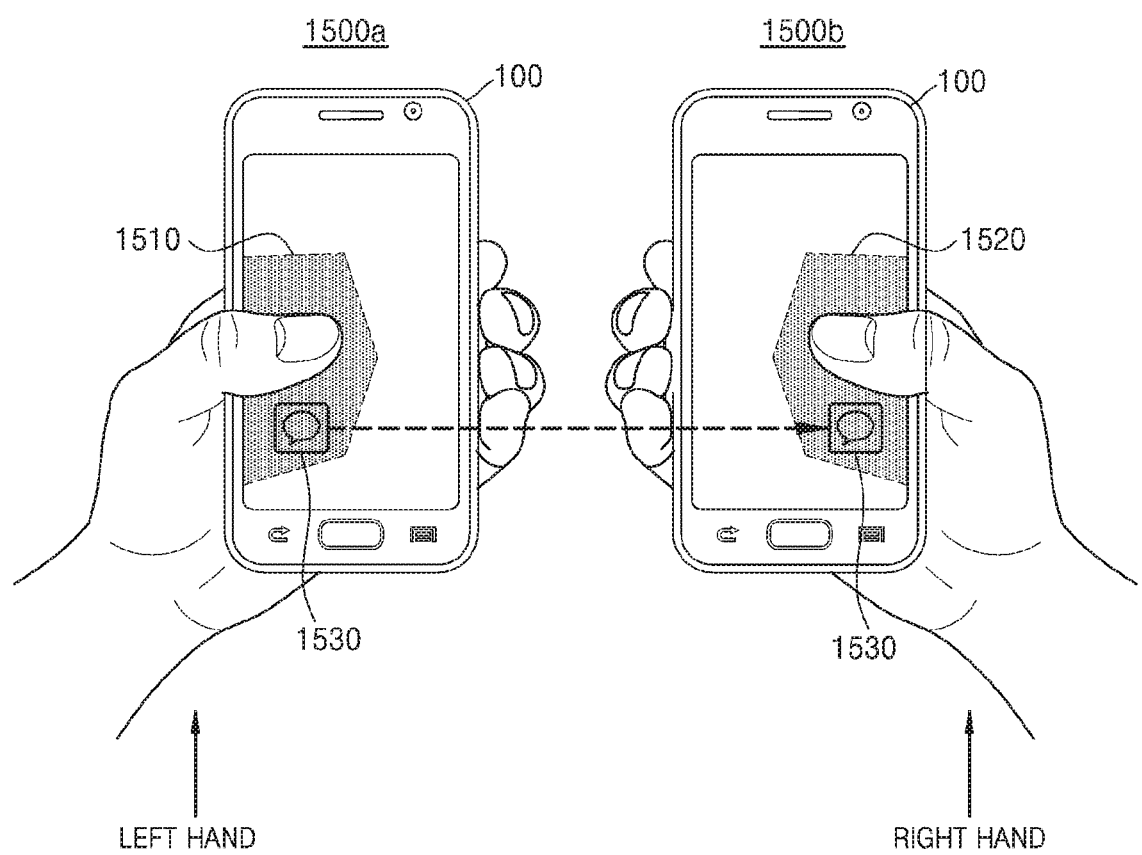
FIG. 15 is a reference view illustrating user-preferred regions selectively arranged in an electronic device depending on a hand of a user with which the electronic device is used according to an exemplary embodiment.

FIG. 15 is a reference view illustrating user-preferred regions selectively arranged in an electronic device depending on a hand of a user with which the electronic device is used according to an exemplary embodiment.

Referring to FIG. 15, 1500*a* shows a user-preferred region 1510 when the user holds and manipulates the electronic device 100 with the left hand, and 1500*b* shows a user-preferred region 1520 when the user holds and manipulates the electronic device 100 with the right hand. For example, when detecting in 1500*a* that the user holds and manipulates the electronic device 100 with the left hand, the electronic device 100 may identify the user-preferred region 1510 at a position close to the left thumb. Also, when detecting in 1500*b* that the user holds and manipulates the electronic device 100 with the right hand, the electronic device 100 may identify the user-preferred region 1520 at a position close to the right thumb. For example, when the user manipulates the electronic device 100 with the left hand, a GUI element 1530 may be displayed in the user-preferred region 1510 arranged on the left side of the electronic device 100, and when the user changes hands and manipulates the electronic device 100 with the right hand, the GUI element 1530 may be displayed in the user-preferred region 1520 arranged on the right side of the electronic device 100.

Figure 16:
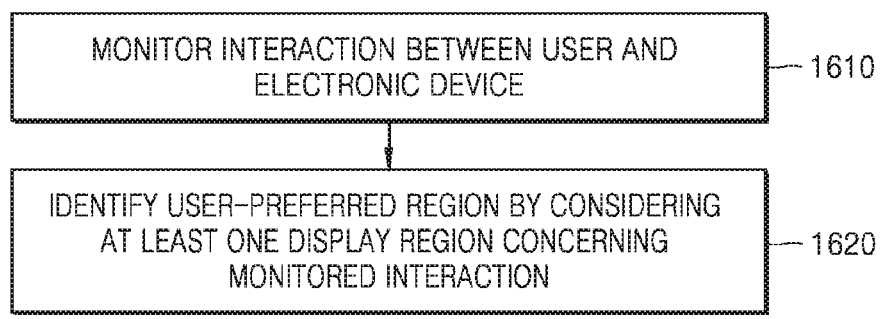
FIG. 16 is a flowchart illustrating a method of identifying a user-preferred region according to an exemplary embodiment.

FIG. 16 is a flowchart illustrating a method of identifying a user-preferred region according to an exemplary embodiment.

Referring to FIG. 16, in operation 1610, the electronic device 100 monitors interactions between the user and the electronic device 100. The interactions between the user and the electronic device 100 refer to motions made by the user on the display of the electronic device 100 to manipulate the electronic device 100, and may include user inputs, for example, a touch, a swipe, a drag, a pinch, and a gesture. For example, the electronic device 400 may monitor interactions between the user and the electronic device 400 using the touch panel 452, the pen sensor 454, the gesture sensor 440A, and so on.

In operation 1620, the electronic device 100 identifies a user-preferred region in consideration of at least one display region corresponding to the monitored interactions.

The electronic device 100 may identify the user-preferred region by considering at least one display region in which the monitored interactions occur.

According to an exemplary embodiment, the electronic device 100 determines a display region frequently used by the user as a user-preferred region by determining the user-preferred region in consideration of a display region most frequently used for the monitored interactions, and may help the user in easily selecting a GUI element by displaying GUI elements in the determined user-preferred region.

According to an exemplary embodiment, the electronic device 100 may monitor user interactions and store user-preferred regions depending on a form in which the user uses the electronic device 100. In other words, by separately monitoring a user interaction when the user grasps and uses the electronic device 100 with his or her left hand, a user interaction when the user grasps and uses the electronic device 100 with his or her right hand, a user interaction when the user horizontally orients the electronic device 100, and a user interaction when the user uses vertically orients the electronic device 100, the electronic device 100 may separately store a user-preferred region when the user graphs and uses the electronic device 100 with the left hand, a user-preferred region when the user graphs and uses the electronic device 100 with the right hand, a user-preferred region when the user uses the electronic device 100 when horizontally oriented, and a user-preferred region when the user uses the electronic device 100 when vertically oriented.

According to an exemplary embodiment, when the electronic device 100 monitors interactions between the user and the electronic device 100, the electronic device 100 may monitor interactions made in one or more preselected applications.

According to an exemplary embodiment, only user interactions made when an application with a high degree of input flexibility is executed may be monitoring targets which are used by the electronic device 100 to determine the preferred region. In other words, only interactions with an application with a high degree of input flexibility may be considered when determining the boundary of the preferred region.

An application with a low degree of input flexibility and an application with a high degree of input flexibility will be described with reference to FIGS. 17A and 17B.

Figure 17A:
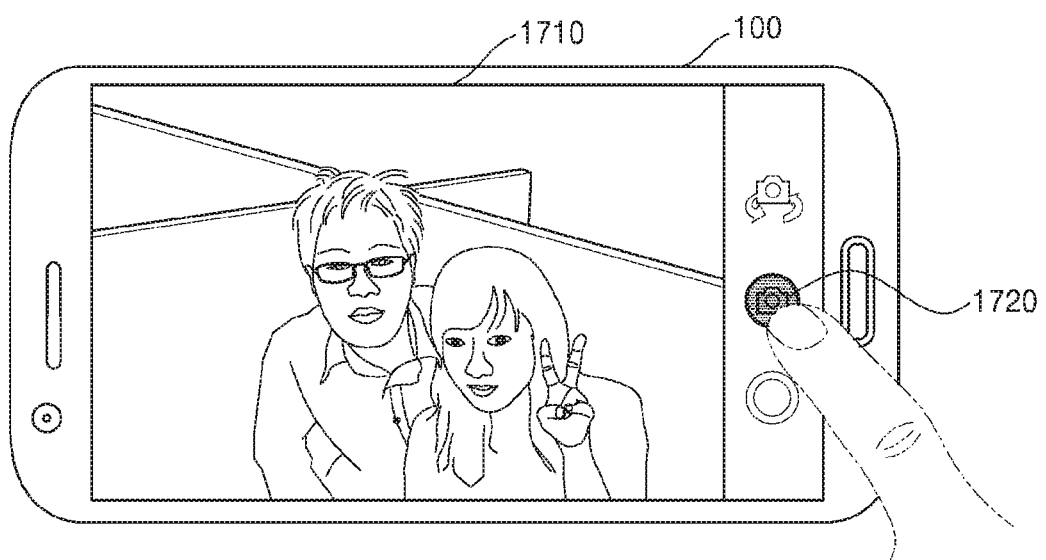
FIG. 17A illustrates an example of an application having a low degree of input flexibility.

FIG. 17A illustrates an example of an application with a low degree of input flexibility.

Referring to FIG. 17A, an application 1710 for capturing a photo is activated in the electronic device 100. In the application 1710 for capturing a photo, the user may focus the electronic device 100 on an object whose photo will be captured and touch a photography button 1720 arranged on the right side of the screen of the electronic device 100, thereby causing the electronic device 100 to perform a photography operation. However, in such a photo capture application, a region for receiving a user's input to capture a photo is limited to a particular region of the screen, and thus the user has no degree of freedom in selecting a region to touch when capturing a photo. Such an application is an application with a low or no degree of input flexibility because the range of input on the display of the electronic device 100 is limited to a small portion of the display. In such an application with a low or no degree of input flexibility, there is no probability that a user's preference will be involved in a user interaction. Therefore, by excluding interactions in such an application with a low or no degree of input flexibility from monitoring, it is possible to prevent distortion of a user-preferred region.

Figure 17B:
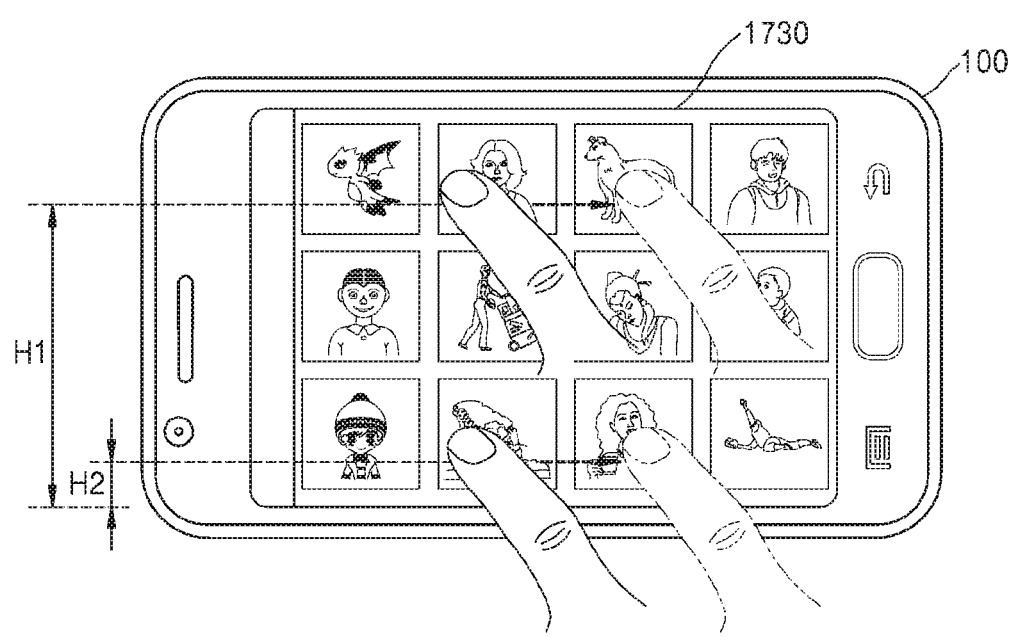
FIG. 17B illustrates an example of an application having a high degree of input flexibility.

FIG. 17B is an example of an application with a high degree of input flexibility.

Referring to FIG. 17B, a photo gallery application 1730 is activated. In the photo gallery application 1730, the user may freely select a height on the screen, for example, H1 or H2, at which a swipe gesture will be made, and may also select a start point and an end point of the gesture. Therefore, the user may swipe to the left or right to see other images in a photo column. In the photo gallery application 1730, the user may swipe to see another photo column at any height H1 or H2 with no problem, and thus there is a high degree of freedom in a height at which the user swipes. Since the user may swipe in his or her preferred region, user interactions in the application 1730 with a high degree of input flexibility may faithfully reflect the user's preference. Therefore, when user interactions in an application with a high degree of input flexibility are monitored in the user's history and used to determine a user-preferred region, it is possible to accurately reflect the user's preference. Other types of interactions allowing a high degree of input flexibility are those applications supporting a pinch-to-zoom function, scrolling up/down in a document or a web page, and up/down/left/right swiping for access from an application menu to an adjustment screen.

Such screen interaction monitoring may be omitted when the preferred region is identified not based on previous interactions between the touch screen and the user but based on a user preference.

Figure 18:
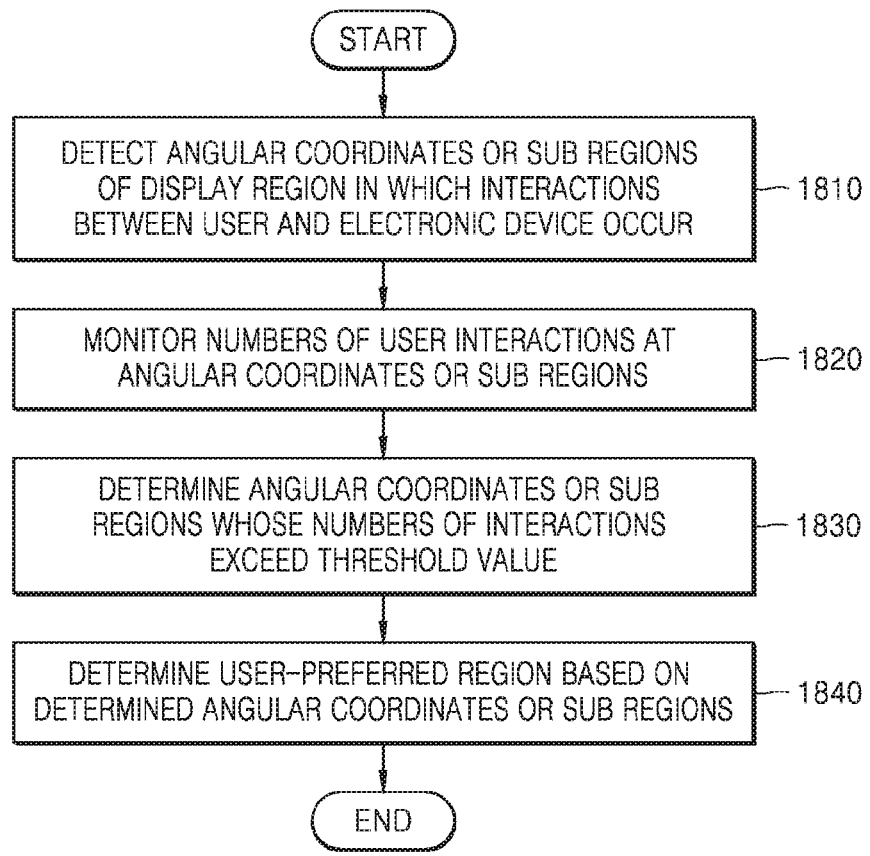
FIG. 18 is a flowchart illustrating a process of determining a user-preferred region based on a user interaction according to an exemplary embodiment.

FIG. 18 is a flowchart illustrating a process of determining a user-preferred region based on a user interaction according to an exemplary embodiment.

Referring to FIG. 18, in operation 1810, an electronic device detects angular coordinates or sub regions in a display region at which an interaction between a user and the electronic device occurs. At this time, as mentioned above, only user interactions in an application with at least one degree of input flexibility rather than user interactions in all applications may be monitoring targets.

In operation 1820, the electronic device monitors the numbers of user interactions at the detected angular coordinates or sub regions.

In operation 1830, the electronic device determines angular coordinates or sub regions whose numbers of monitored interactions exceed a threshold value.

In operation 1840, the electronic device determines a user-preferred region based on determined angular coordinates or sub regions.

For example, the electronic device may monitor user interactions using the user interaction monitoring module 171 or 322.

According to an exemplary embodiment, the user interaction monitoring module 171 or 322 of the electronic device 100 or 300 may store coordinates of touch events during a particular time period (e.g., one day/one week/one month, etc.) or store coordinates of a particular number of touch events, for example, the most recent touch events.

According to an exemplary embodiment, the user-preferred region identification module 172 or 321 of the electronic device 100 may variously identify the user-preferred region, such as determining a boundary of a region covering a certain percentage of the stored touch events. As another method, a machine learning algorithm may be used. For example, the machine learning algorithm may receive various inputs (e.g., a contact area between the user's finger and the touch screen, a duration of a particular touch event, a speed of a particular gesture, an entire display region, a region preferred as an arbitrary initial default, etc., but inputs are not limited thereto).

According to an exemplary embodiment, the user interaction monitoring module 171 or 322 of the electronic device 100 or 300 may store an interaction history of the current user as a heat map or a density map instead of storing coordinates of each touch event. In these maps, a higher score is allocated to a region or coordinates corresponding to a larger number of touch events.

Figure 19A:
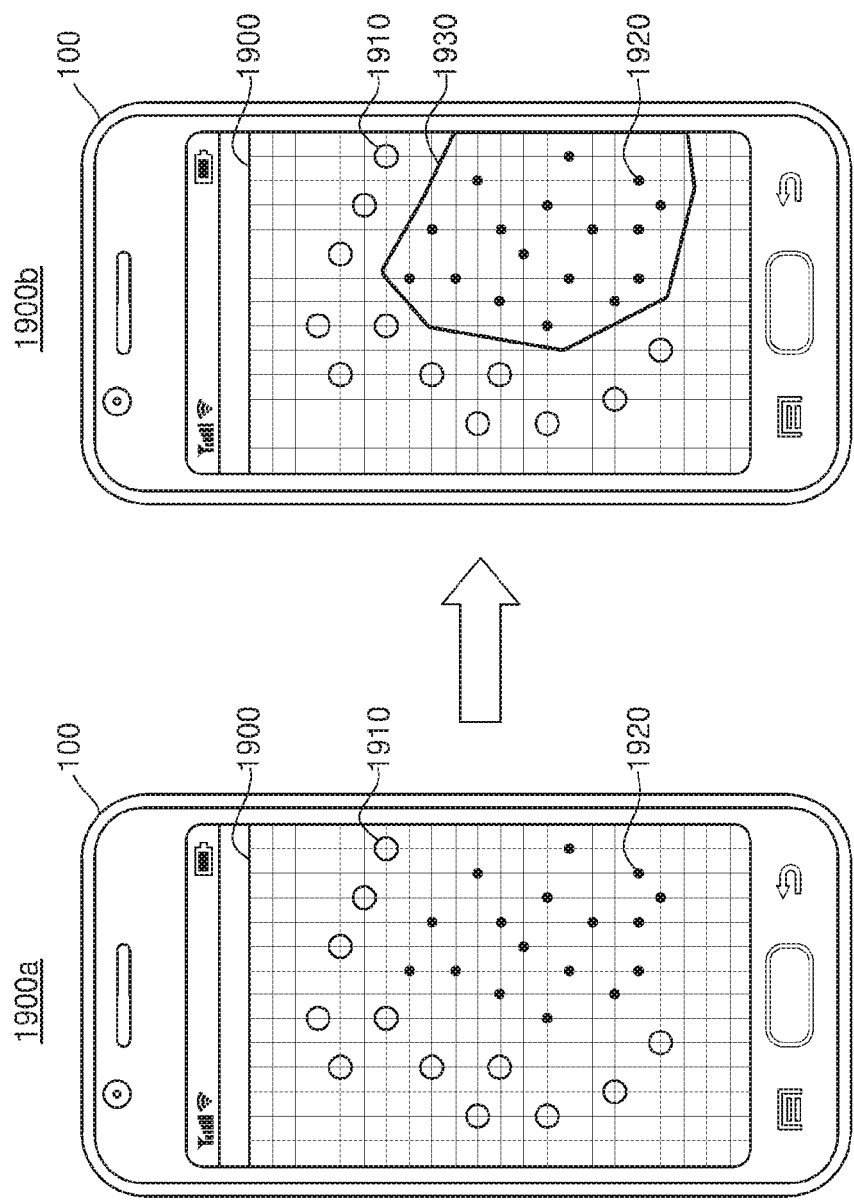
FIG. 19A is a reference view illustrating an example of determining a user-preferred region based on user interactions according to an exemplary embodiment.

FIG. 19A is a reference view illustrating an example of determining a user-preferred region based on user interactions according to an exemplary embodiment.

Referring to FIG. 19A, the electronic device 100 may detect the quantity of interactions at angular coordinates or sub regions in a display region 1900 as a result of monitoring user interactions in predetermined applications, for example, applications with a high degree of input flexibility. The electronic device 100 may detect angular coordinates or sub regions whose quantity of interactions exceed a threshold value among angular coordinates or sub regions whose quantity of interactions have been detected. For example, in 1900a, angular coordinates or sub regions whose quantity of interactions exceed the threshold value are indicated by points 1920, and angular coordinates or sub regions whose quantity of interactions do not exceed the threshold value are indicated by empty circles 1910.

According to an exemplary embodiment, as shown in 1900b, the electronic device 100 may determine a region covering angular coordinates or small regions whose quantities of interactions exceed the threshold value as a user-preferred region 1930.

Figure 19B:
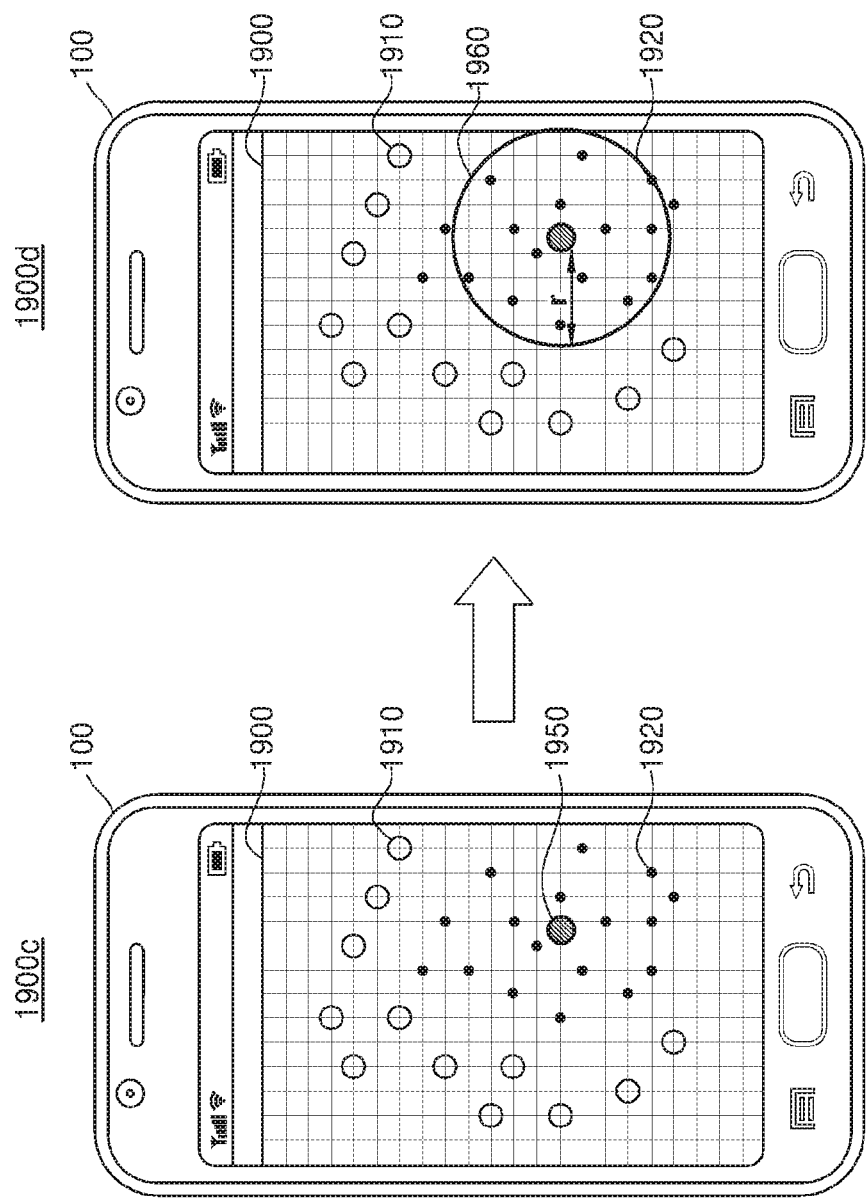
FIG. 19B is a reference view illustrating an example of determining a user-preferred region based on user interactions according to an exemplary embodiment.

FIG. 19B is a reference view illustrating an example of determining a user-preferred region based on user interactions according to an exemplary embodiment.

Referring to FIG. 19B, the electronic device 100 calculates an average of angular coordinates whose quantities of interactions exceed a threshold value or an average of angular coordinates of sub regions whose quantities of interactions exceed the threshold value, and determines a center position 1950 according to the average, as shown in 1900c. The center position 1950 may be coordinates of an average contact point.

According to an exemplary embodiment, as shown in 1900d, the electronic device 100 may determine a circle 1960 having a radius r from the determined center position 1950 as a user-preferred region.

Figure 20:
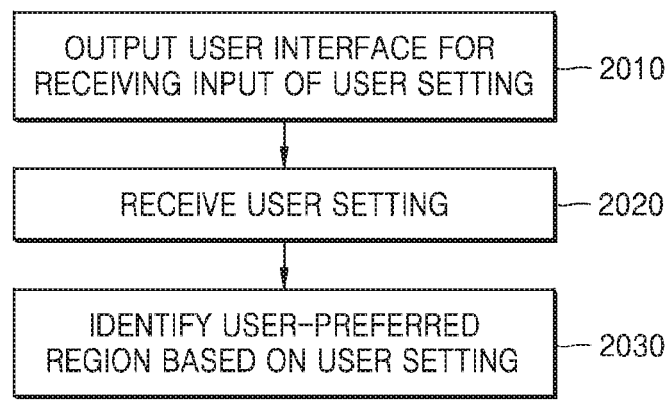
FIG. 20 is a flowchart illustrating a method of identifying a user-preferred region according to an exemplary embodiment.

FIG. 20 is a flowchart illustrating a method of identifying a user-preferred region according to an exemplary embodiment.

Referring to FIG. 20, in operation 2010, an electronic device outputs a user interface for receiving an input of a user setting.

In operation 2020, the electronic device receives a user setting through the user interface.

In operation 2030, the electronic device identifies a user-preferred region based on the received user setting.

The user interface for receiving an input of a user setting may include, for example, the user interface shown in FIG. 6A. Through the user interface shown in FIG. 6A, a user may select left or right handed operation. In such an exemplary embodiment, a preferred region may be identified by checking whether the user has selected left or right handed operation. When left handed operation is selected in the user interface, a preferred region may be identified on the left side of the touch screen close to the user's left thumb. Likewise, when right handed operation is selected, a preferred region may be identified on the right side of the touch screen. However, in another embodiment, a machine learning algorithm may be used to adjust a preferred region based on previous interactions between the touch screen and the user.

According to an exemplary embodiment, the user may personally set a display region for displaying GUI elements on a display.

FIG. 21 is a reference view illustrating a method of configuring a user-preferred region according to an exemplary embodiment.

In 2100a of FIG. 21, the electronic device 100 may output a user interface 2110 for setting a user-preferred region. In the user interface 2110, a message 2111 "draw a desired user-preferred region with your finger" may be displayed. The user may draw a user-preferred region 2130 by touching with a finger or thumb 2120.

The electronic device 100 receives a trace of the touch with the finger 2120 of the user, and may store information on the trace as a user-preferred region 2140. When it is necessary to display GUI elements thereafter, the electronic device 100 identifies the stored user-preferred region 2140 and displays the GUI elements in the identified user-preferred region 2140, so that the GUI elements may be displayed in a display region wanted by the user.

FIGS. 22A, 22B, 22C, and 22D are diagrams illustrating GUI elements displayed in a user-preferred region of an electronic device according to an exemplary embodiment.

Figure 22A:
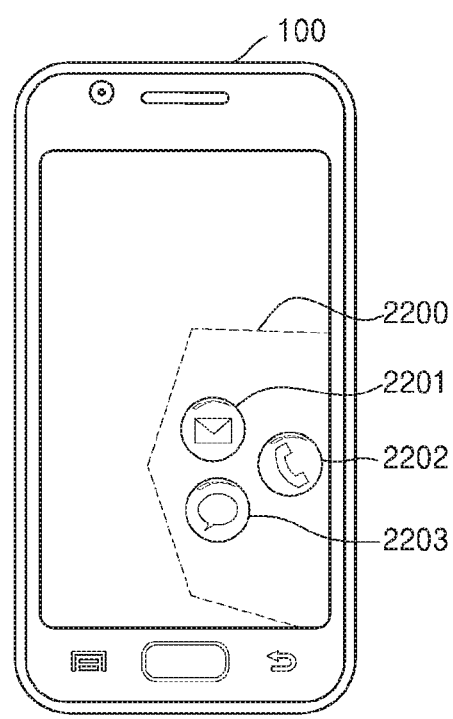
FIGS. 22A, 22B, 22C, and 22D are diagrams illustrating graphical user interface (GUI) elements displayed in a user-preferred region of an electronic device according to an exemplary embodiment.

FIG. 22A shows an example in which each of one or more GUI elements are displayed in a user-preferred region of an electronic device. Referring to FIG. 22A, a GUI element 2201 indicating reception of a new e-mail, a GUI element 2202 indicating that there is a missed call, and a GUI element 2203 indicating reception of a new message are displayed in a user-preferred region 2200 of the electronic device 100. Each GUI element may be displayed in various shapes. Each GUI element in FIG. 22A are displayed in the shape of a bubble.

Figure 22B:
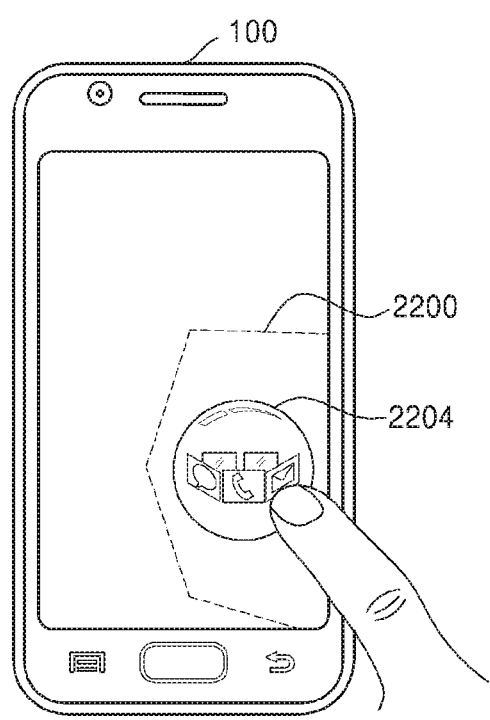

FIG. 22B shows an example in which one group object corresponding to one or more GUI elements is displayed in a user-preferred region of an electronic device. Referring to FIG. 22B, in the user-preferred region 2200 of the electronic device 100, a GUI element indicating reception of a new e-mail, a GUI element indicating that there is a missed call, a GUI element indicating reception of a new message, etc. all are displayed in an image 2204 representing one large group object.

For example, when there are too many GUI elements to be displayed in the user-preferred region 2200, the electronic device 100 may group several GUI elements together and display the GUI elements as one group object.

Figure 22C:
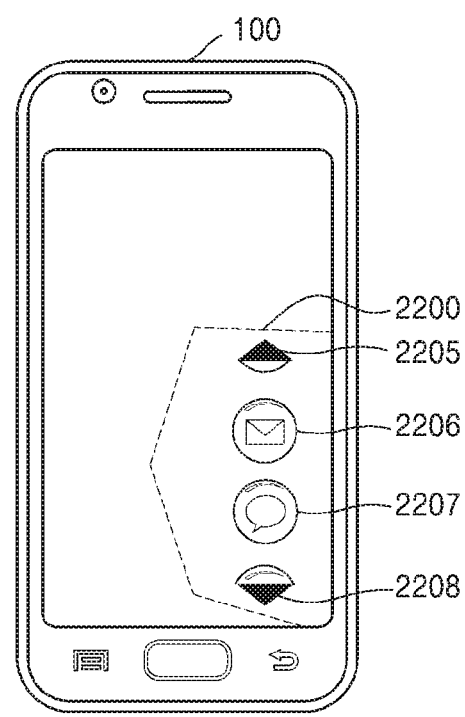

FIG. 22C shows an example in which one or more GUI elements are displayed in a user-preferred region of an electronic device by scrolling. Referring to FIG. 22C, only some of GUI elements to be displayed may be displayed in the user-preferred region 2200 of the electronic device 100, and other GUI elements may be revealed by scrolling. In other words, in the user-preferred region 2200, only a GUI element 2206 indicating reception of a new e-mail and a GUI element 2207 indicating reception of a new message are displayed, and an arrow element 2205 which enables upward scrolling to display other GUI elements and an arrow element 2208 which enables downward scrolling to display other GUI elements may be additionally displayed. The electronic device 100 may display GUI elements hidden above when the user selects the arrow element 2205, and may display GUI elements hidden below when the user selects the arrow element 2208.

Figure 22D:
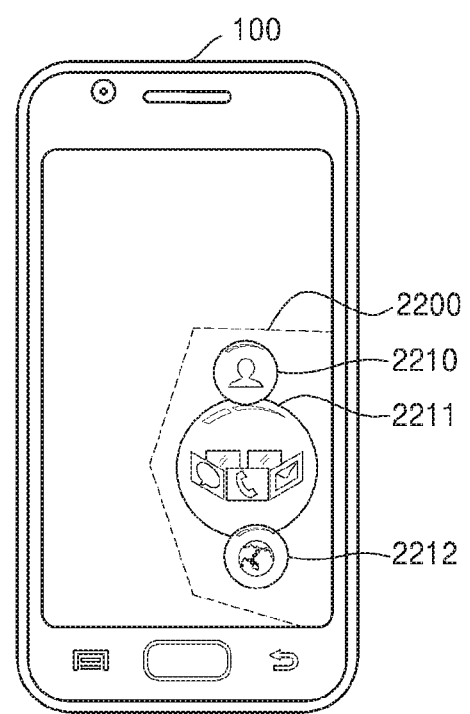

FIG. 22D shows an example in which one or more GUI elements and a group object are displayed together in a user-preferred region. Referring to FIG. 22D, the electronic device 100 displays individual GUI elements 2210 and 2212 and a group object 2211 together in the user-preferred region 2200.

According to an exemplary embodiment, an electronic device may display a GUI element representing an event notification in a user-preferred region thereof. The electronic device may display the GUI element representing an event notification in a lock screen thereof or when a user manipulates the electronic device.

Figure 23A:
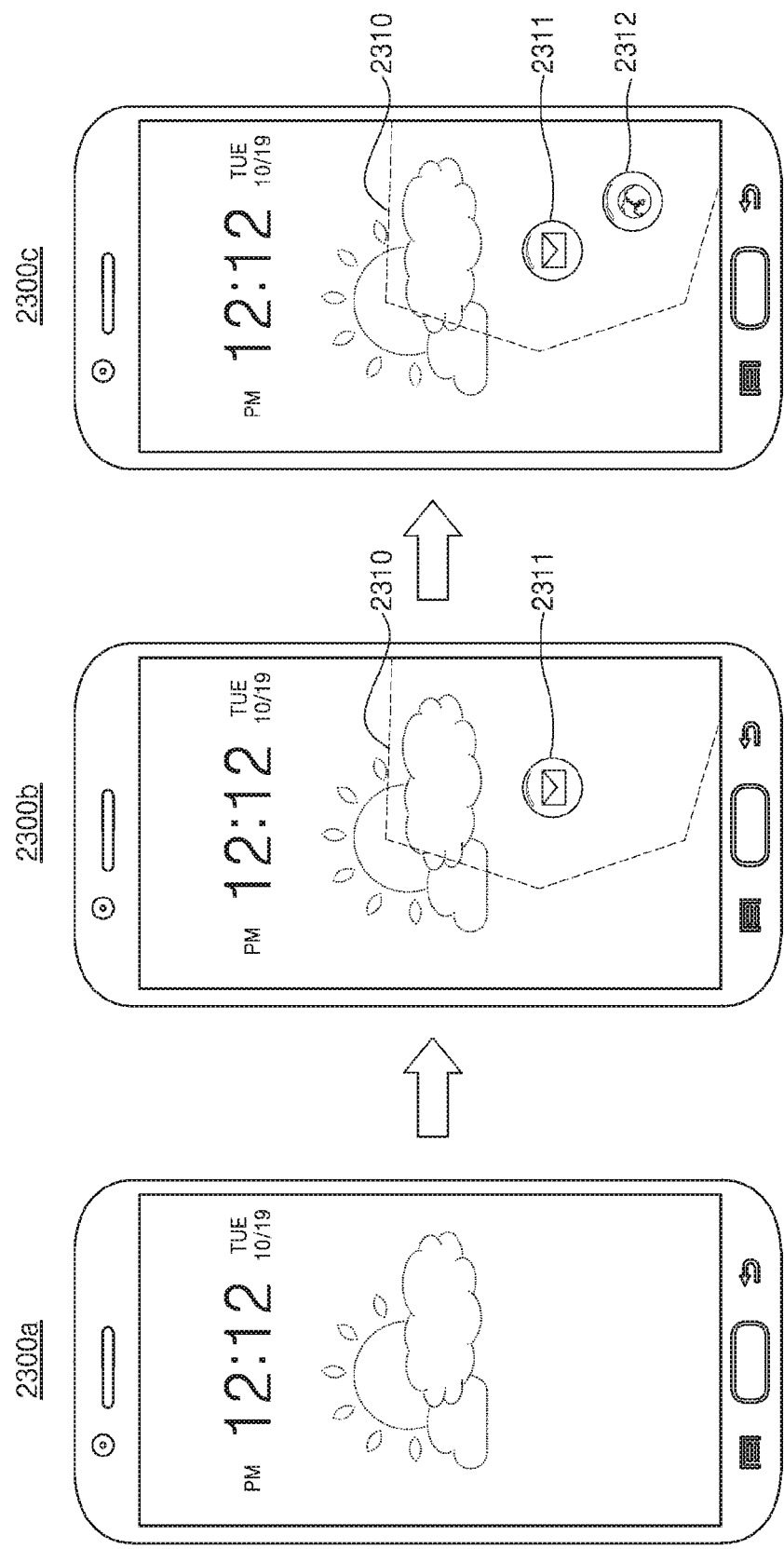
FIGS. 23A, 23B, and 23C illustrate GUI elements displayed in a user-preferred region on a lock screen when an event notification is provided in the lock screen of an electronic device according to an exemplary embodiment.
Figure 23B:
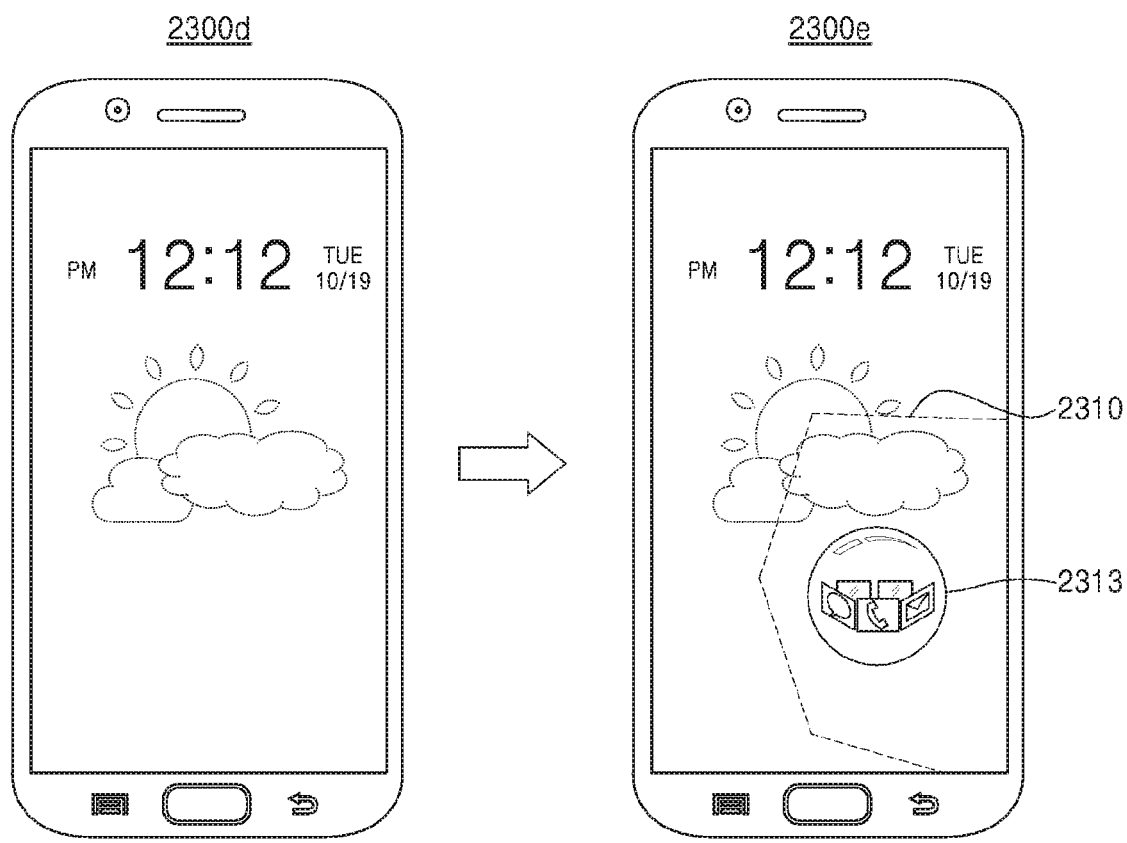
Figure 23C:
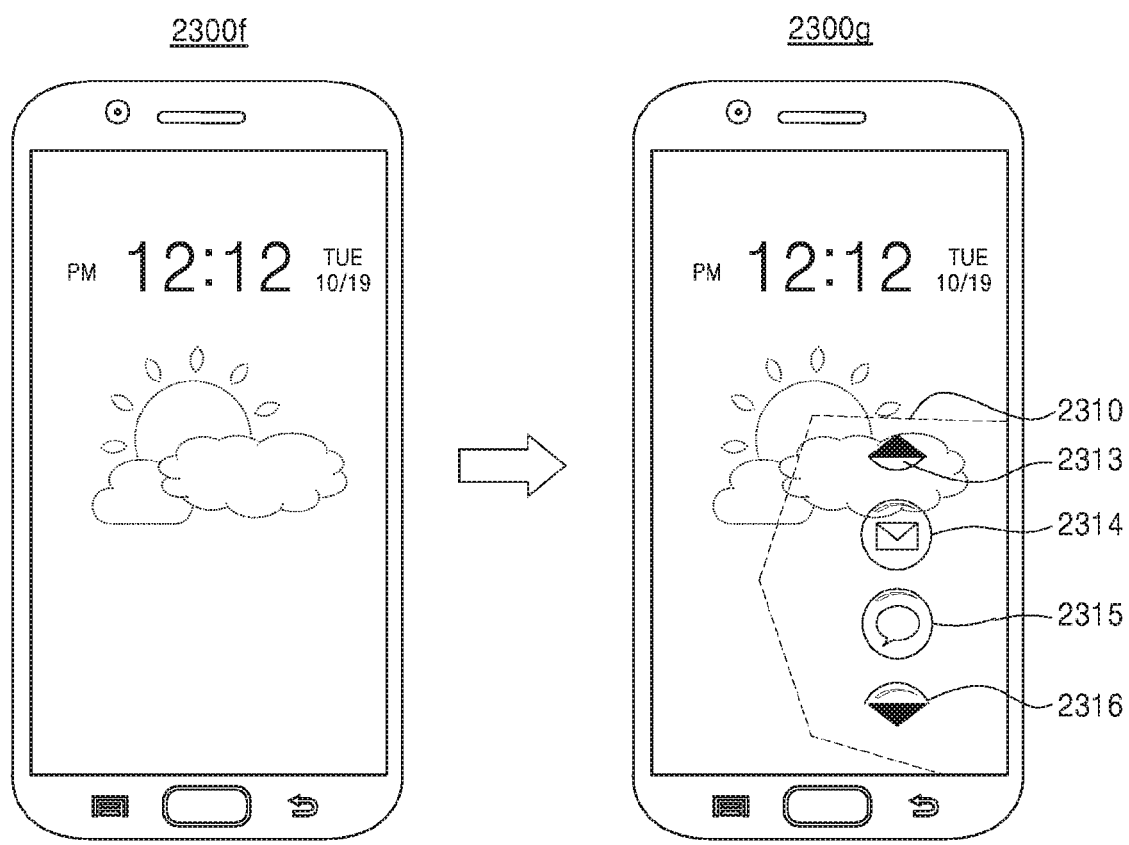

FIGS. 23A, 23B, and 23C illustrate GUI elements displayed in a user-preferred region on a lock screen when an event notification is generated in the lock screen of the electronic device according to an exemplary embodiment.

FIG. 23A shows an example in which one or more GUI elements all may be displayed in a user-preferred region in a lock screen state according to an exemplary embodiment.

In FIG. 23A, view 2300a shows the lock screen state of an electronic device. When a new e-mail is received in the lock screen state, the electronic device may identify a user-preferred region 2310 first, and display a GUI element 2311 for an event notification indicating that a new e-mail has been received in the identified user-preferred region 2310. View 2300b shows a state in which the GUI element 2311 is displayed in the user-preferred region 2310.

When a new message is received in the state of 2300b before a user selects and checks the GUI element 2311 indicating the reception of a new e-mail, the electronic device may further display a GUI element 2312 indicating the reception of a new message in the user-preferred region 2310 as shown in view 2300c.

In this way, every time a GUI element to be displayed in the user-preferred region 2310 is newly generated, the electronic device may additionally display the newly generated GUI element in the user-preferred region 2310.

FIG. 23B shows an example in which all of one or more GUI elements may not be displayed in a user-preferred region in the lock screen state according to an exemplary embodiment.

View 2300d of FIG. 23B shows the lock screen state of an electronic device in which no GUI element is displayed. In the lock screen state, a plurality of new notifications may be generated at the same time, and there may be space insufficient to display GUI elements corresponding to the plurality of new notifications together in the user-preferred region 2310. In this case, the electronic device may display one group object 2313 corresponding to the plurality of GUI elements in the user-preferred region 2310. The group object 2313 may be displayed as an image for indicating that a plurality of GUI elements corresponding to a plurality of notification events are contained in the group object 2313. For example, as shown in 2300e, the group object 2313 may have one large bubble shape which contains images of a plurality of GUI elements in small size.

FIG. 23C shows another example in which all of one or more GUI elements may not be displayed in a user-preferred region in the lock screen state according to an exemplary embodiment.

View 2300f of FIG. 23C shows the lock screen state of an electronic device in which no GUI element is displayed. In the lock screen state, when there is insufficient space to display together GUI elements corresponding to a plurality of new notifications generated at the same time in a user-preferred region, the electronic device may display the GUI elements by scrolling.

Referring to view 2300g, the electronic device may display two GUI elements 2314 and 2315, an arrow element 2313 that enables upward scrolling, and an arrow element 2316 that enables downward scrolling in the user-preferred region 2310. The user may scroll using the arrow icon 2313 or 2316 to reveal GUI elements previously concealed in the user-preferred region 2310.

FIG. 24 is a flowchart of a method of displaying at least one GUI element in a user-preferred region according to an exemplary embodiment.

Referring to FIG. 24, in operation 2410, an electronic device determines whether display of all GUI elements in an identified user-preferred region is possible. Regardless of the number of GUI elements displayed in the user-preferred region, the electronic device may determine whether display of a newly generated GUI element is possible in view of the current state of the user-preferred region. For example, when display of a maximum of four GUI elements in the user-preferred region is possible, a new GUI element may be generated while four GUI elements are currently being displayed in the user-preferred region. At this time, the electronic device may determine that display of all the GUI elements in the identified user-preferred region is impossible.

When the electronic device determines that display of all the GUI elements in the identified user-preferred region is possible, the electronic device may display a newly generated GUI element in the user-preferred region in operation 2450.

When the electronic device determines that display of all the GUI elements in the identified user-preferred region is impossible, the electronic device may display a group object corresponding to one or more GUI elements in the user-preferred region in operation 2420.

When a user selects the group object displayed in the user-preferred region in operation 2430, the electronic device may separately display the one or more GUI elements corresponding to the group object in operation 2440.

Figure 25:
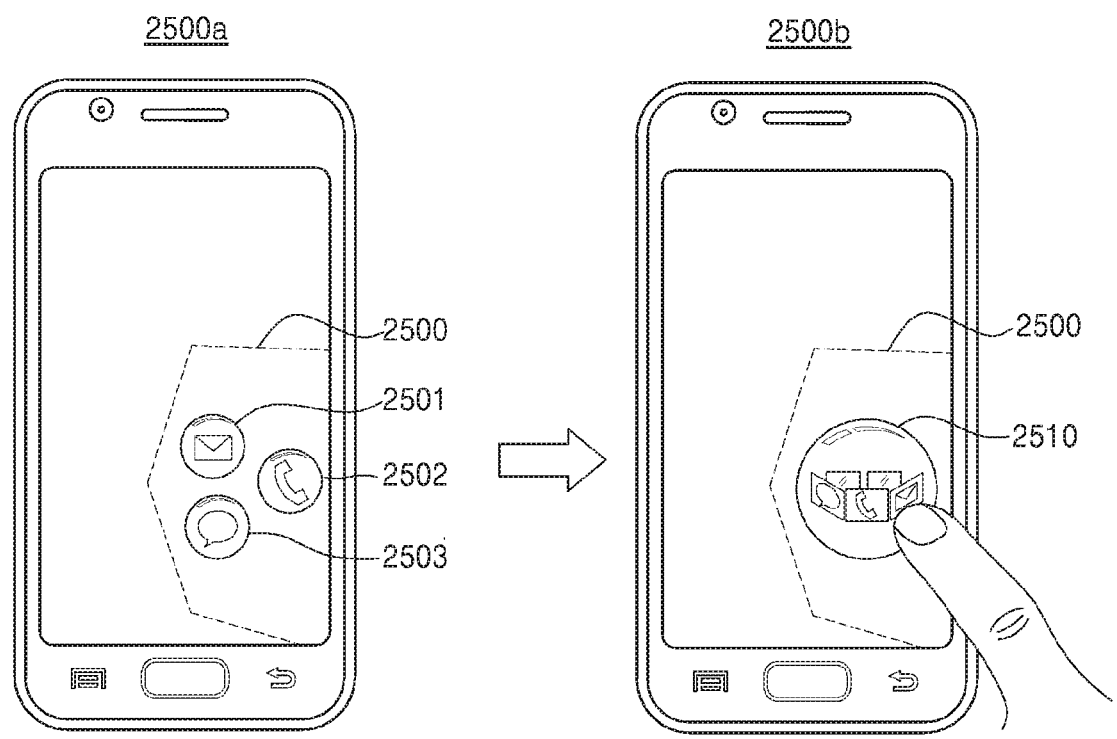
FIG. 25 is a reference view illustrating a group object according to an exemplary embodiment.

FIG. 25 is a reference view illustrating a group object according to an exemplary embodiment.

In FIG. 25, view 2500a shows a state in which three GUI elements 2501, 2502, and 2503 are displayed in a user-preferred region 2500 of an electronic device. When two GUI elements to be displayed in the user-preferred region 2500 are newly generated while the three GUI elements 2501, 2502, and 2503 are displayed in the user-preferred region 2500, the electronic device may determine whether there is additional display space for the two GUI elements in the user-preferred region 2500. When the space of the user-preferred region 2500 is insufficient to display the two additional GUI elements, the electronic device may display one group object 2510 corresponding to a total of five GUI elements to be displayed in the user-preferred region 2500.

View 2500b shows a state in which the group object 2510 is displayed in the user-preferred region 2500.

Figure 26A:
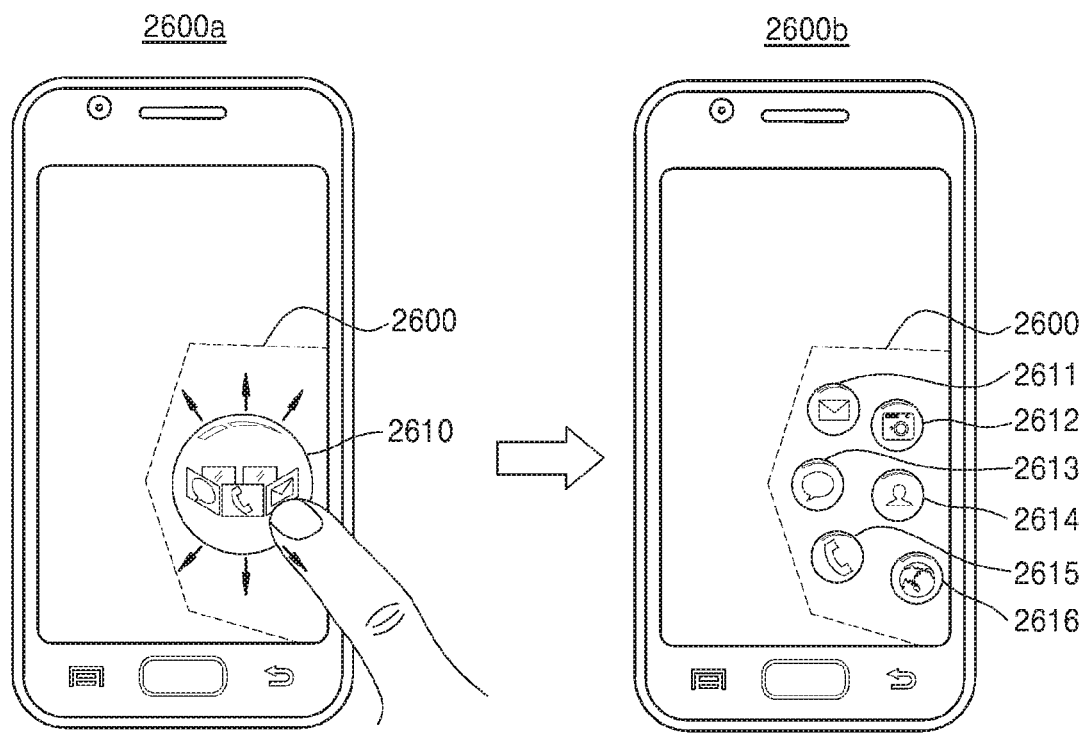
FIG. 26A illustrates an example of a user interface when a group object is selected according to an exemplary embodiment.

FIG. 26A illustrates an example of a user interface when a group object is selected according to an exemplary embodiment when a group object is selected.

Referring to FIG. 26A, view 2600a shows a state in which one group object 2610 corresponding to a plurality of GUI elements is displayed in a bubble shape in a user-preferred region 2600.

View 2600b shows the result obtained when a user selects the group object 2610 in the bubble shape. When the user selects the group object 2610, an electronic device may display individual GUI elements 2611 to 2616 related to the group object 2610 using animations that show the individual GUI elements 2611 to 2616 as additional bubbles splattering out of the group object 2610 or moving out of the group object 2610. The individual GUI elements 2611 to 2616 in bubble shapes separated from the group object 2610 in the bubble shape are reduced in size, so that all the GUI elements 2611 to 2616 may be displayed in the user-preferred region 2600.

Figure 26B:
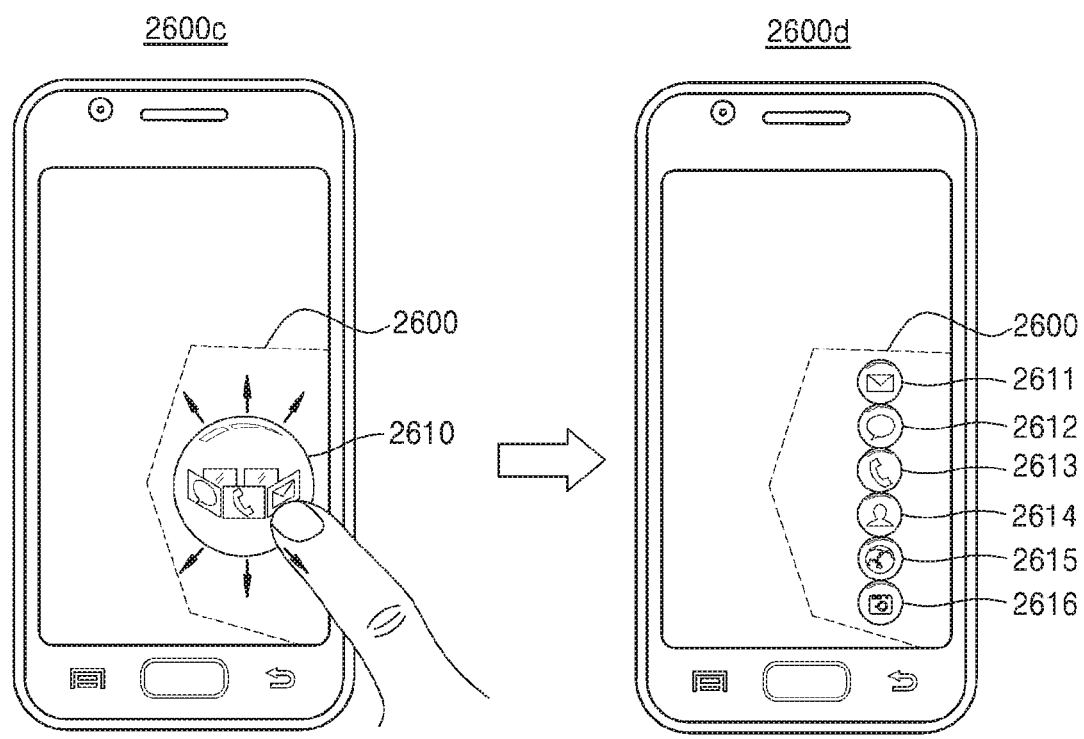
FIG. 26B illustrates a user interface when a group object is selected according to an exemplary embodiment.

FIG. 26B illustrates a user interface when a group object is selected according to an exemplary embodiment.

Referring to FIG. 26B, view 2600c shows the same state as in FIG. 26A, and view 2600d shows the result obtained when the user selects the group object 2610 in the bubble shape. When the user selects the group object 2610, the electronic device may display the individual GUI elements 2611 to 2616 related to the group object 2610 using animations that show the individual GUI elements 2611 to 2616 as additional bubbles separated from the group object 2610. The individual GUI elements 2611 to 2616 in bubble shapes separated from the group object 2610 in the bubble shape are displayed to overlap each other, so that all the GUI elements 2611 to 2616 may be displayed in the user-preferred region 2600.

Figure 26C:
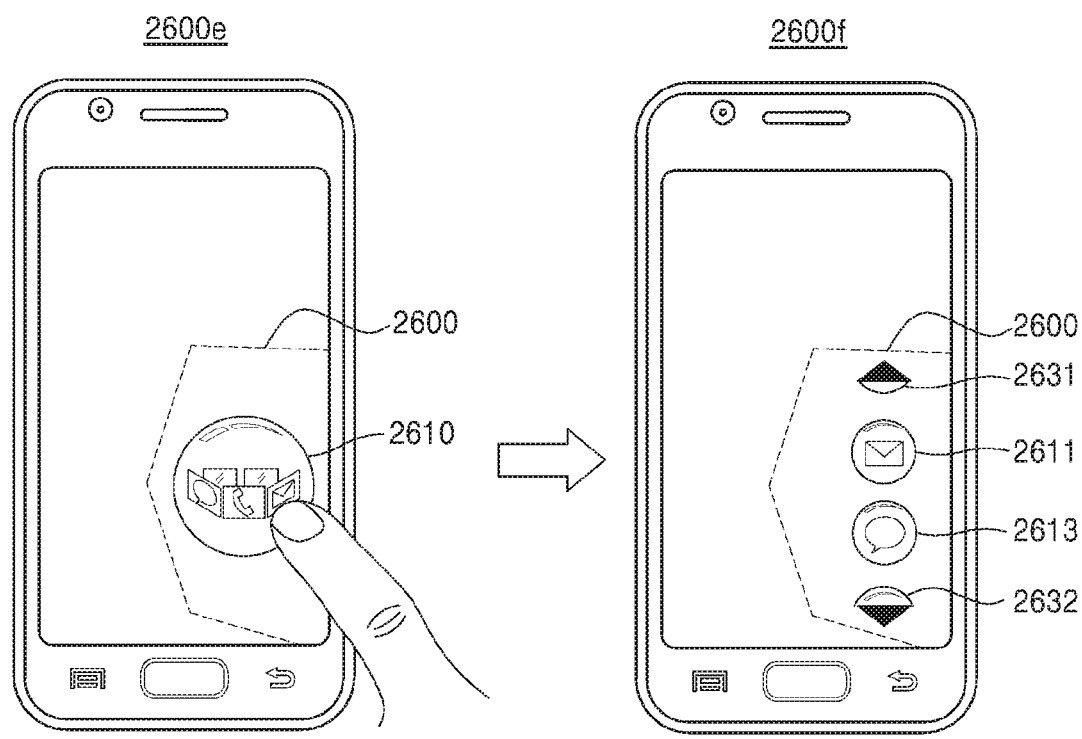
FIG. 26C illustrates a user interface when a group object is selected according to an exemplary embodiment.

FIG. 26C illustrates a user interface when a group object is selected according to an exemplary embodiment.

Referring to FIG. 26C, view 2600e shows the same state as in FIG. 26A, and view 2600f shows the result obtained when the user selects the group object 2610 in the bubble shape.

In view 2600f, a subset of individual GUI elements 2611 to 2616 may be displayed to be scrollable when there is insufficient space to display all the individual GUI elements 2611 to 2616 of the group object 2610. An upward arrow icon 2631 and a downward arrow icon 2632 may be displayed to indicate that other GUI elements may be accessed by scrolling up/down (e.g., swiping a displayed GUI element 2611 or 2613 up or down or touching the upward or downward arrow icon 2631 or 2632). In this way, the user may scroll through all of the GUI elements within the user-preferred region 2600.

Figure 27:
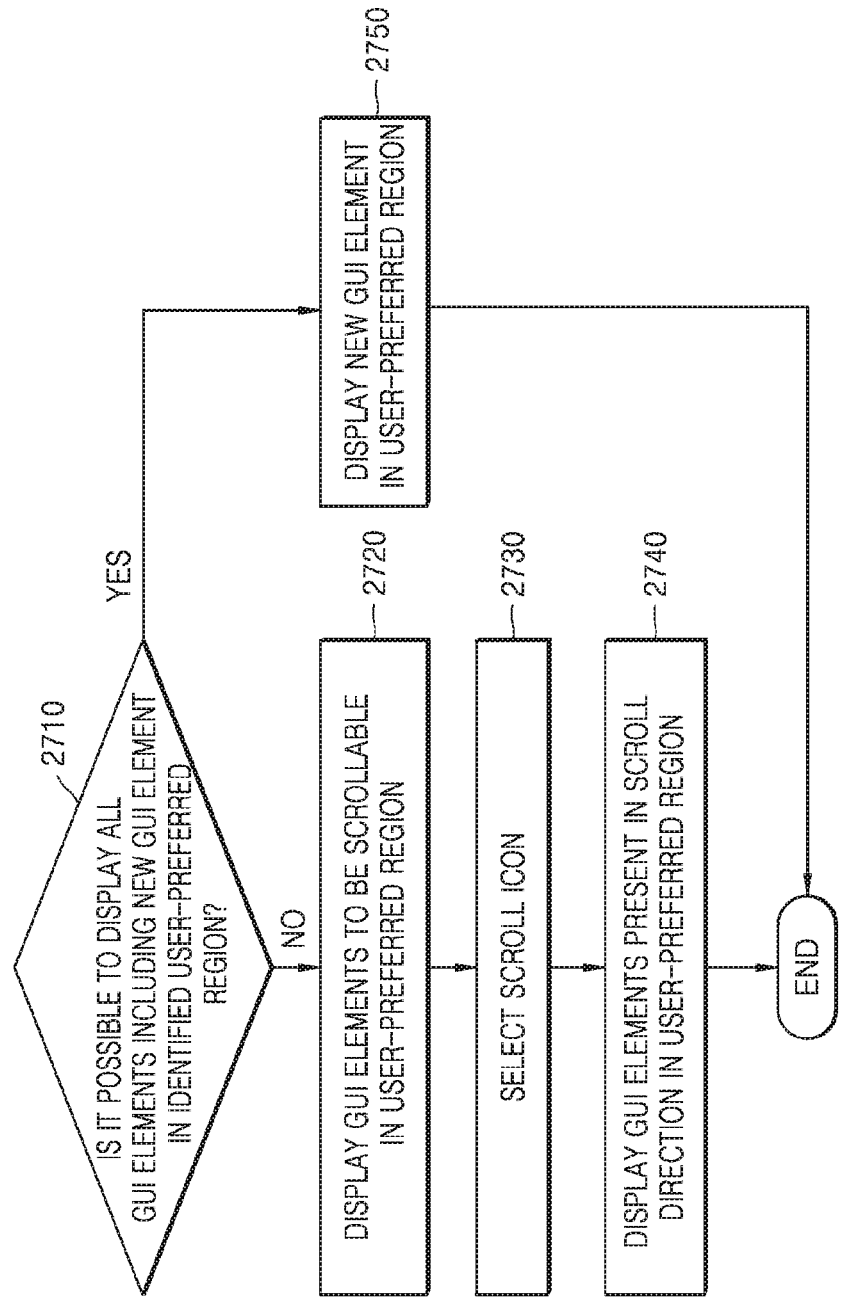
FIG. 27 is a flowchart illustrating a method of displaying a GUI element in a user-preferred region according to an exemplary embodiment.

FIG. 27 is a flowchart illustrating a method of displaying a GUI element in a user-preferred region according to an exemplary embodiment.

Referring to FIG. 27, in operation 2710, an electronic device determines whether display of all GUI elements in an identified user-preferred region is possible.

When it is determined that display of all the GUI elements in the identified user-preferred region is possible, the electronic device may display a newly generated GUI element in the user-preferred region in operation 2750.

When it is determined that display of all the GUI elements in the identified user-preferred region is impossible, the electronic device displays a plurality of GUI elements to be scrollable in the user-preferred region in operation 2720.

When a user selects a scroll icon displayed in the user-preferred region in operation 2730, the electronic device may display GUI elements present in a scroll direction in the user-preferred region in operation 2740.

Figure 28:
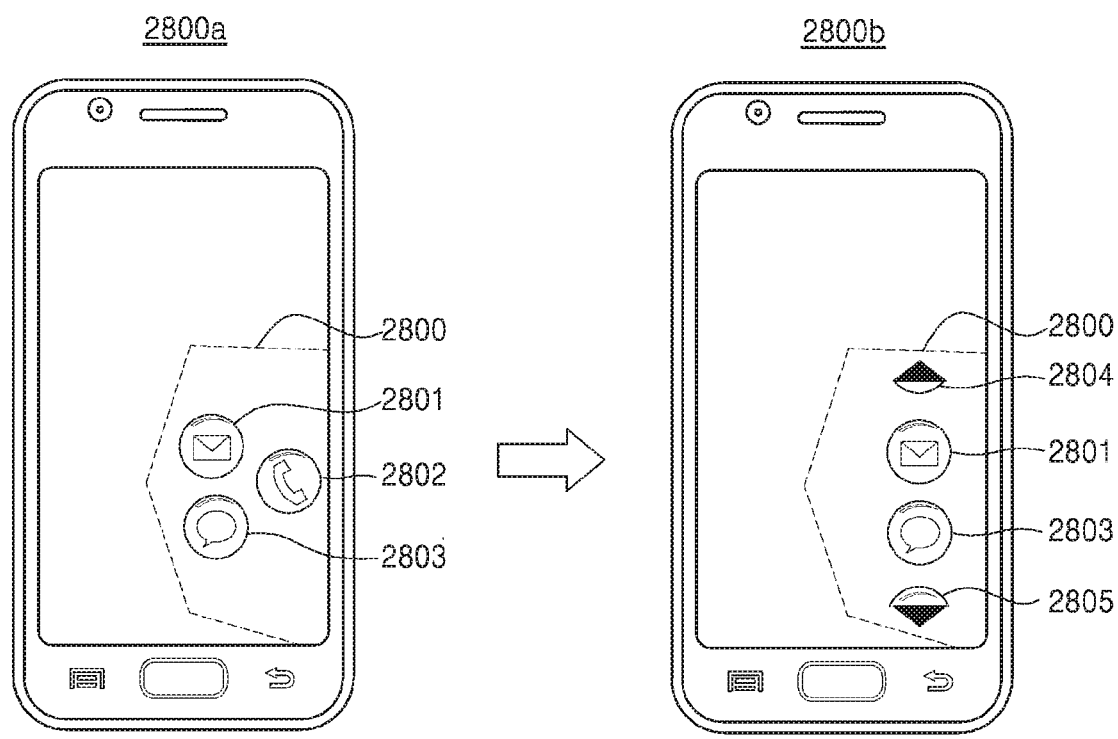
FIG. 28 is a reference view illustrating scrollable GUI elements according to an exemplary embodiment.

FIG. 28 is a reference view illustrating scrollable GUI elements according to an exemplary embodiment.

Referring to FIG. 28, view 2800a shows a state in which three GUI elements 2801, 2802, and 2803 are displayed in a user-preferred region 2800.

View 2800b shows an example in which, when a new GUI element to be additionally displayed is generated, display of the three GUI elements 2801, 2802, and 2803 and the newly generated GUI element together in the user-preferred region 2800, is impossible and thus the GUI elements are displayed to be scrolled. An upward arrow icon 2804 and a downward arrow icon 2805 may be displayed to indicate that other GUI elements may be accessed by scrolling up/down (e.g., swiping a displayed GUI element 2801 or 2803 up or down or touching the upward or downward arrow icon 2804 or 2805). In this way, a user may scroll through all of the GUI elements within the user-preferred region 2800.

Figure 29:
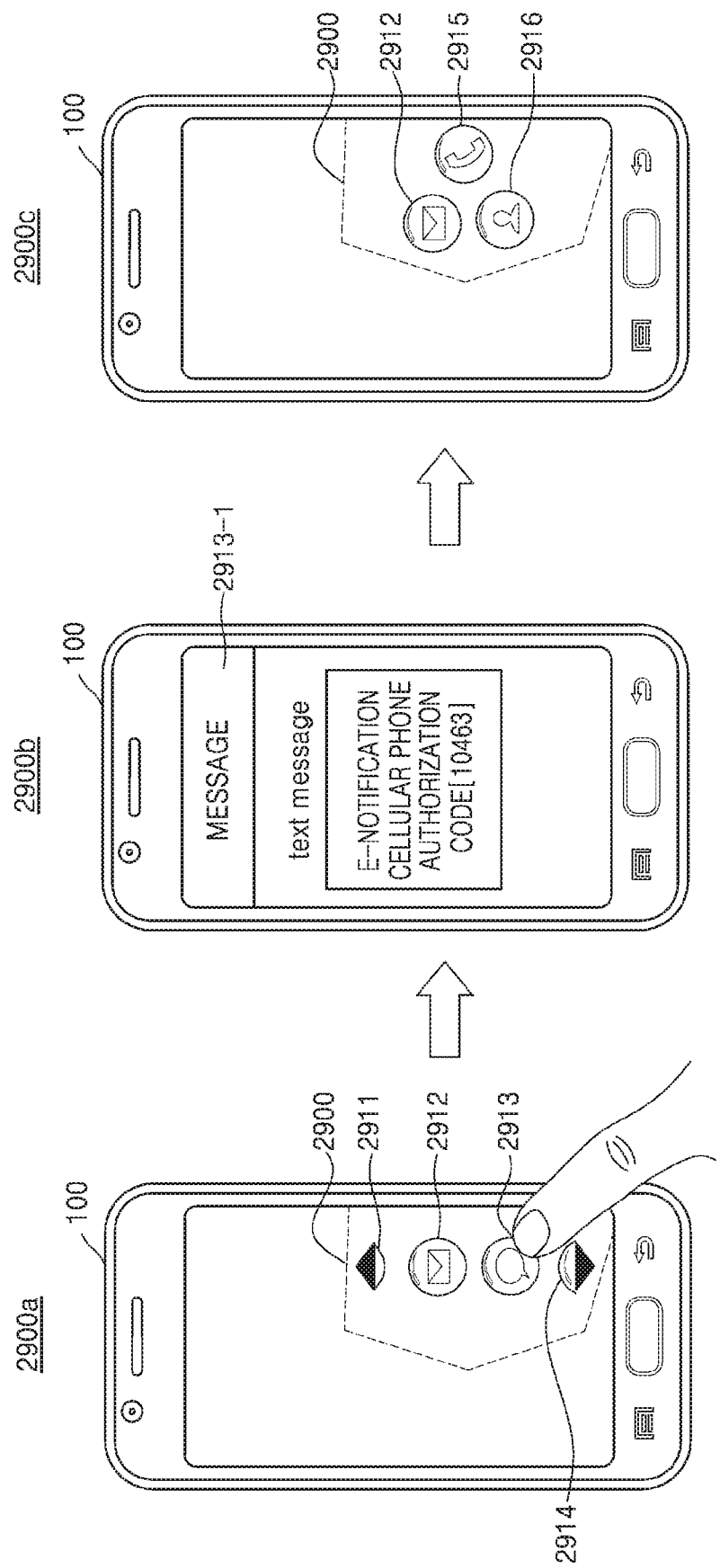
FIG. 29 is a reference view illustrating selection of a scrollable GUI element according to an exemplary embodiment.

FIG. 29 is a reference view illustrating selection of a scrollable GUI element according to an exemplary embodiment.

View 2900a shows a state in which GUI elements 2912 and 2913 are displayed and an upward arrow icon 2911 and a downward arrow icon 2914 are displayed for scrolling in a user-preferred region 2900 of the electronic device 100.

View 2900b shows a state in which an application 2913-1 for reading a message newly received by the electronic device 100 is displayed on the display of the electronic device 100 when the user selects the GUI element 2913 representing a notification of reception of a new message in the state of 2900a.

View 2900c shows a screen displayed on the display of the electronic device 100 after the user checks the new message and ends the message application 2913-1. Since the user has checked the new message, display of the GUI element 2913 representing the notification of reception of a new message may be no longer necessary. Therefore, the electronic device 100 may not display the GUI element 2913, and may display individual GUI elements 2912, 2915, and 2916 as shown in 2900c when display of all GUI elements except the GUI element 2913 in the user-preferred region 2900 is possible.

Figure 30:
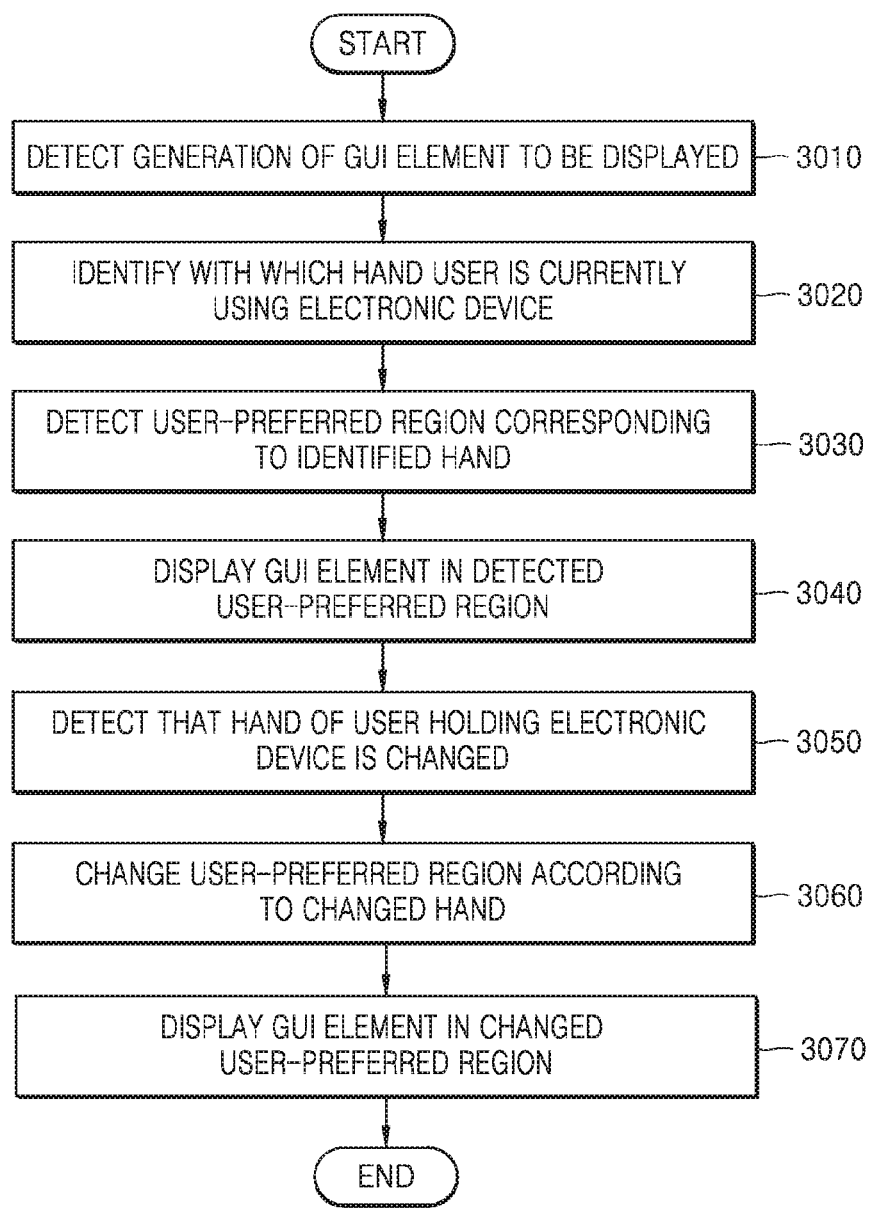
FIG. 30 is a flowchart illustrating a method of operating an electronic device according to an exemplary embodiment.

FIG. 30 is a flowchart illustrating a method of operating of an electronic device according to an exemplary embodiment.

Referring to FIG. 30, in operation 3010, an electronic device detects that a GUI element to be displayed in a user-preferred region has been generated.

In operation 3020, the electronic device identifies a hand of a user with which the electronic device is currently being used. The electronic device may identify with which hand the user is currently holding the electronic device using, for example, a touch panel or so on. For example, when the user holds the electronic device with the right hand, the electronic device may sense a touch on the right side of the touch panel, and when the user holds the electronic device with the left hand, the electronic device may sense a touch on the left side of the touch panel.

In operation 3030, the electronic device detects a user-preferred region corresponding to the identified hand.

In operation 3040, the electronic device displays a GUI element in the detected user-preferred region.

When using the electronic device 100, the user may manipulate the electronic device 100 while alternately holding the electronic device 100 with the right hand and left hand in real time. Therefore, the electronic device 100 may adaptively change a user-preferred region according to a hand of the user holding the electronic device 100.

In operation 3050, the electronic device detects that the hand of the user holding the electronic device is changed.

In operation 3060, the electronic device changes the user-preferred region according to the changed hand of the user. For example, the user may hold and use the electronic device with the left hand and then hold and use the electronic device with the right hand.

In operation 3070, the electronic device displays the GUI element in the changed user-preferred region.

Figure 31:
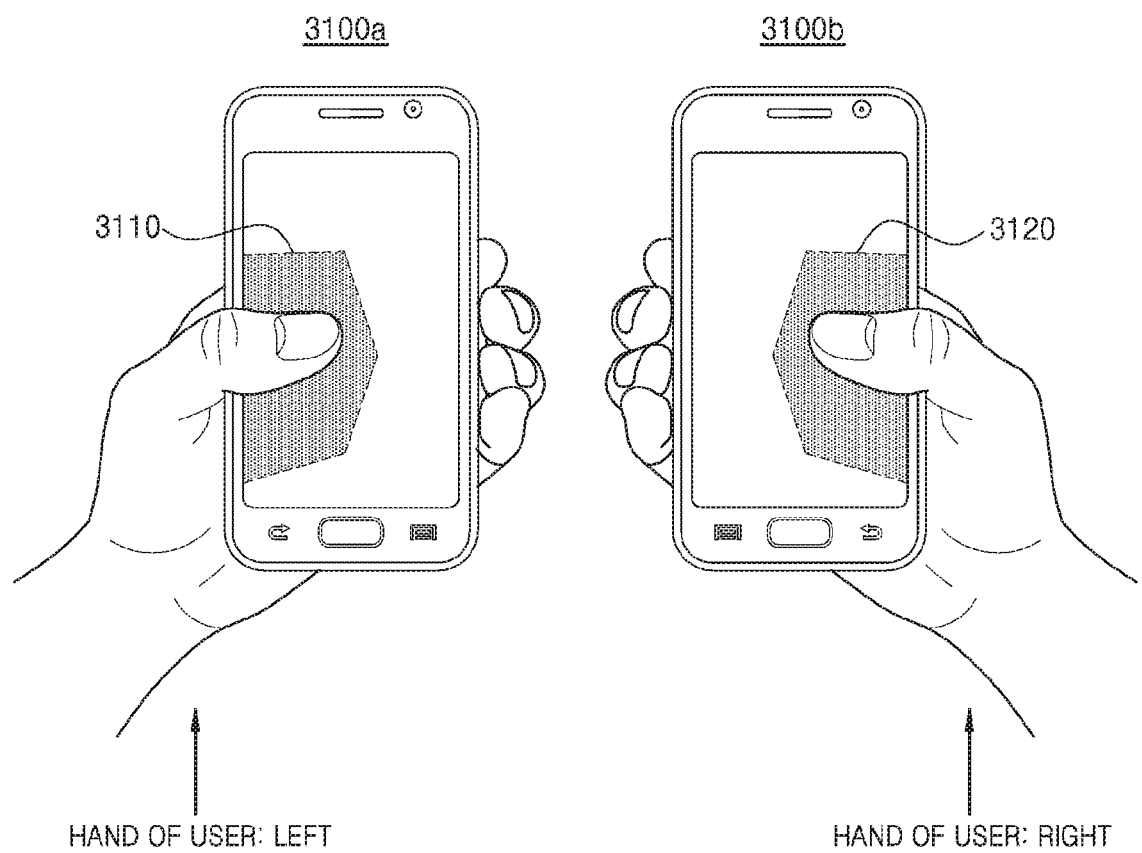
FIG. 31 is a reference view illustrating the a method of operating an electronic device according to an exemplary embodiment.

FIG. 31 is a reference view illustrating a method of operating an electronic device according to an exemplary embodiment.

In FIG. 31, view 3100*a* shows that, when the user holds and manipulates the electronic device 100 with the left hand, the electronic device 100 detects that the user is holding the electronic device 100 with the left hand and accordingly identifies a user-preferred region 3110 at a position close to the user's left hand.

View 3100*b* shows that, when the user holds and manipulates the electronic device 100 with the right hand, the electronic device 100 detects that the user is holding the electronic device 100 with the right hand and accordingly identifies a user-preferred region 3120 at a position close to the user's right hand.

When using the electronic device 100, the user may manipulate the electronic device 100 while alternately holding the electronic device 100 with the right hand and left hand in real time. Therefore, when the electronic device 100 detects that the user uses the electronic device 100 with the left hand as shown in 3100*a*, the electronic device 100 may display a GUI element in the user-preferred region 3110 arranged at the position close to the user's left hand, and when the user moves the electronic device from the left hand to the right hand and manipulates the electronic device 100 with the right hand, the electronic device 100 detects that the user's hand manipulating the electronic device 100 has been changed and accordingly identify a user-preferred region corresponding to the changed hand.

Figure 32:
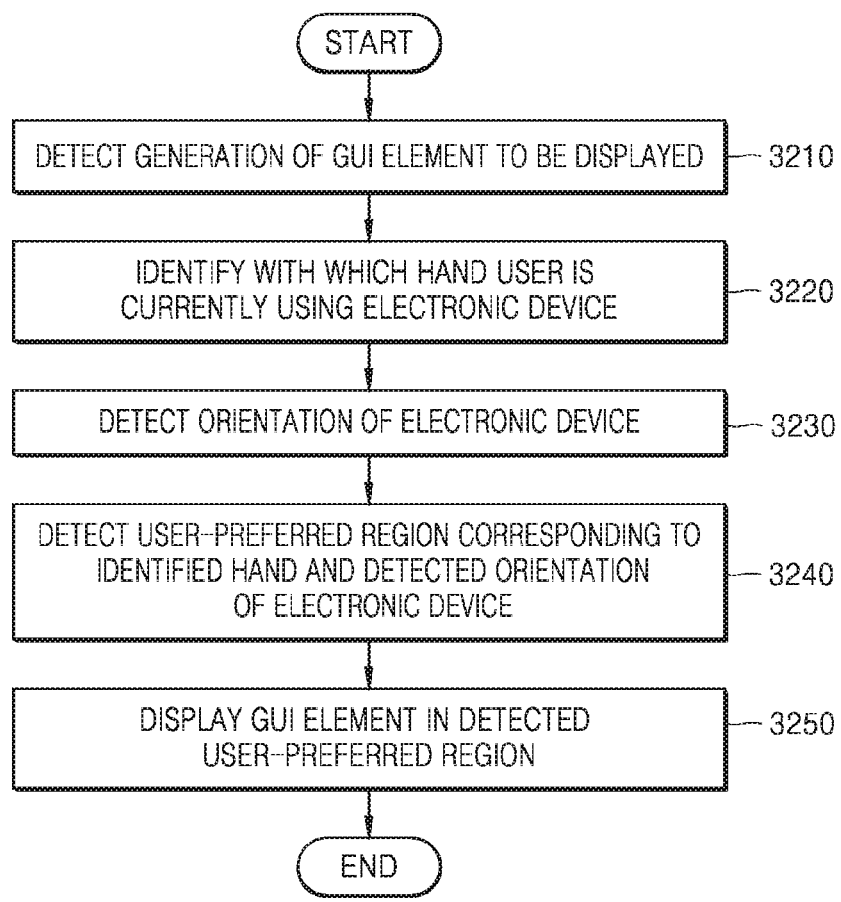
FIG. 32 is a flowchart illustrating a method of operating an electronic device according to an exemplary embodiment.

FIG. 32 is a flowchart illustrating a method of operating an electronic device according to an exemplary embodiment.

Referring to FIG. 32, in operation 3210, an electronic device detects that a GUI element to be displayed in a user-preferred region has been generated.

In operation 3220, the electronic device identifies with which hand a user is currently using the electronic device.

The electronic device may identify with which hand the user is currently holding the electronic device using, for example, a touch panel or so on. For example, when the user holds the electronic device with the right hand, the electronic device may sense a touch on the right side of the touch panel, and when the user holds the electronic device with the left hand, the electronic device may sense a touch on the left side of the touch panel.

In operation 3230, the electronic device detects a current orientation of the electronic device. The electronic device may check the orientation using an appropriate orientation mechanism such as a gyroscope. When the electronic device is differently oriented, different preferred regions may be implemented. For example, a preferred region may vary according to whether the user holds the electronic device with the longer sides of the electronic device placed in a vertical or horizontal direction.

In operation 3240, the electronic device identifies a user-preferred region corresponding to the identified hand and the orientation of the electronic device.

According to whether the user holds the electronic device with the left or right hand and whether the electronic device is oriented horizontally or vertically, the electronic device may differently implement the user-preferred region.

In operation 3250, the electronic device displays a GUI element in the detected user-preferred region.

Figure 33A:
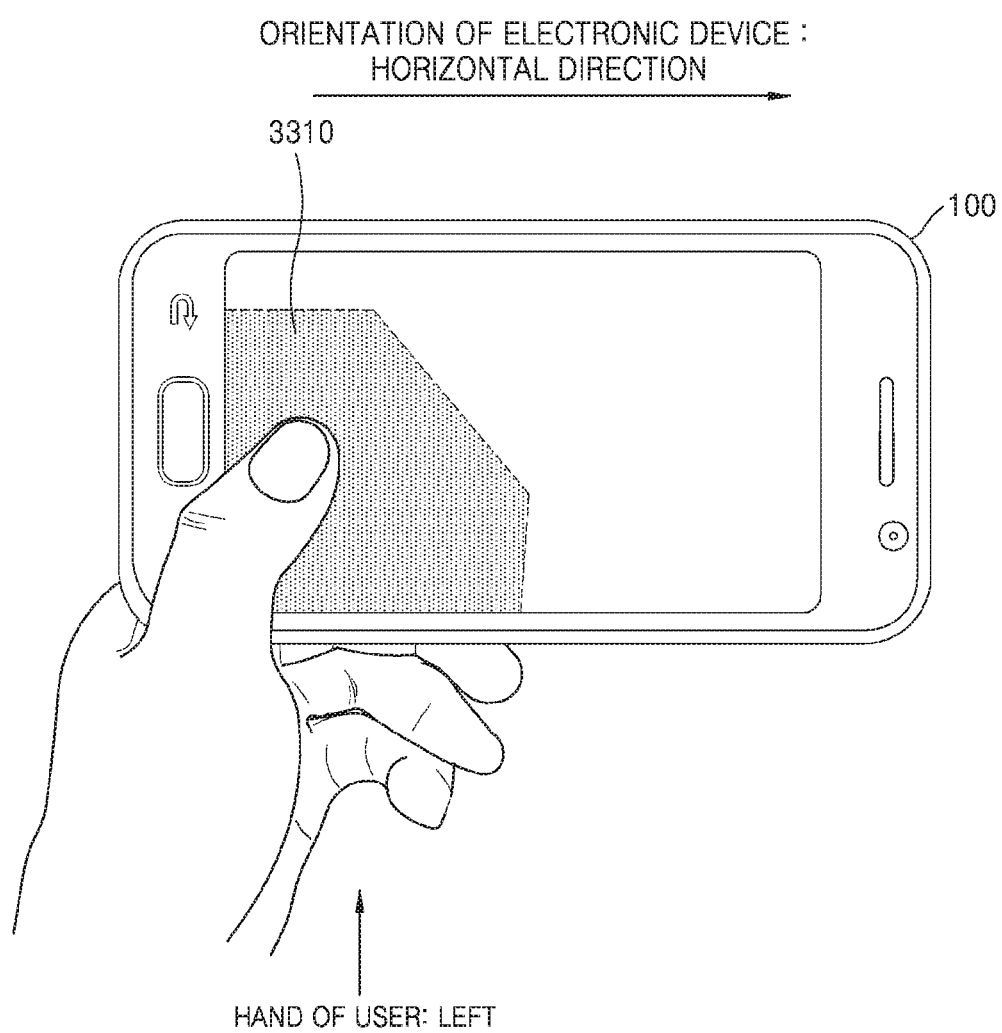
FIGS. 33A and 33B are reference views illustrating methods of operating an electronic device according to an exemplary embodiment.
Figure 33B:
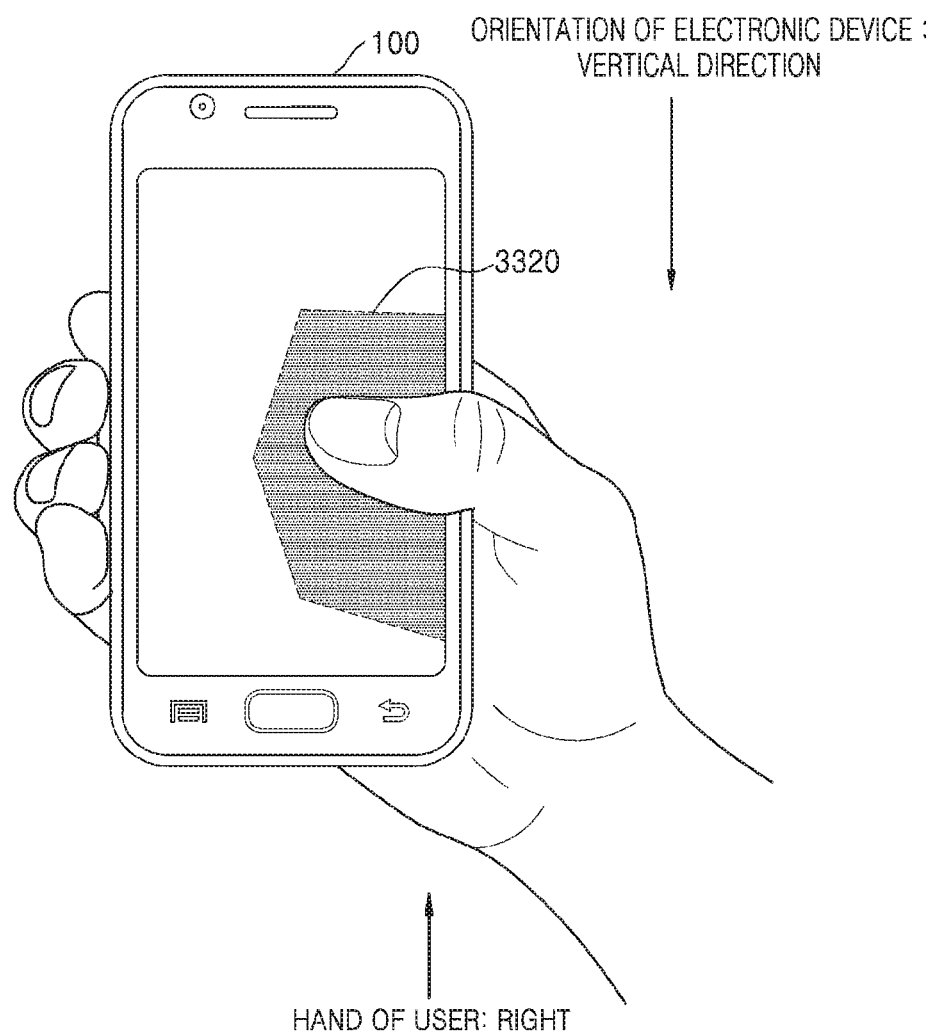

FIGS. 33A and 33B are reference views illustrating methods of operating an electronic device according to an exemplary embodiment.

Referring to FIG. 33A, the user holds the electronic device 100 with the left hand in a horizontal orientation. Therefore, in this case, the electronic device 100 may identify a user-preferred region 3310 at a lower left portion in the display region of the electronic device 100 by considering that the user is holding the electronic device 100 with the left hand and the electronic device 100 is oriented in a horizontal direction. According to an exemplary embodiment, a user-preferred region determined by monitoring user interactions when the user holds and uses the electronic device 100 with his or her left hand in the horizontal orientation may be stored, and the electronic device 100 may identify the stored user-preferred region when the user holds and uses the electronic device 100 horizontally with the left hand.

Referring to FIG. 33B, the user holds the electronic device 100 with the right hand in a vertical orientation. Therefore, in this case, the electronic device 100 may identify a user-preferred region 3320 at a center right portion in the display region of the electronic device 100 by considering that the user is holding the electronic device 100 with the right hand and the electronic device 100 is oriented in the vertical direction. According to an exemplary embodiment, a user-preferred region determined by monitoring user interactions when the user holds and uses the electronic device 100 with his or her right hand in the vertical orientation may be stored, and the electronic device 100 may identify the stored user-preferred region when the user holds and uses the electronic device 100 vertically with the right hand.

Figure 34:
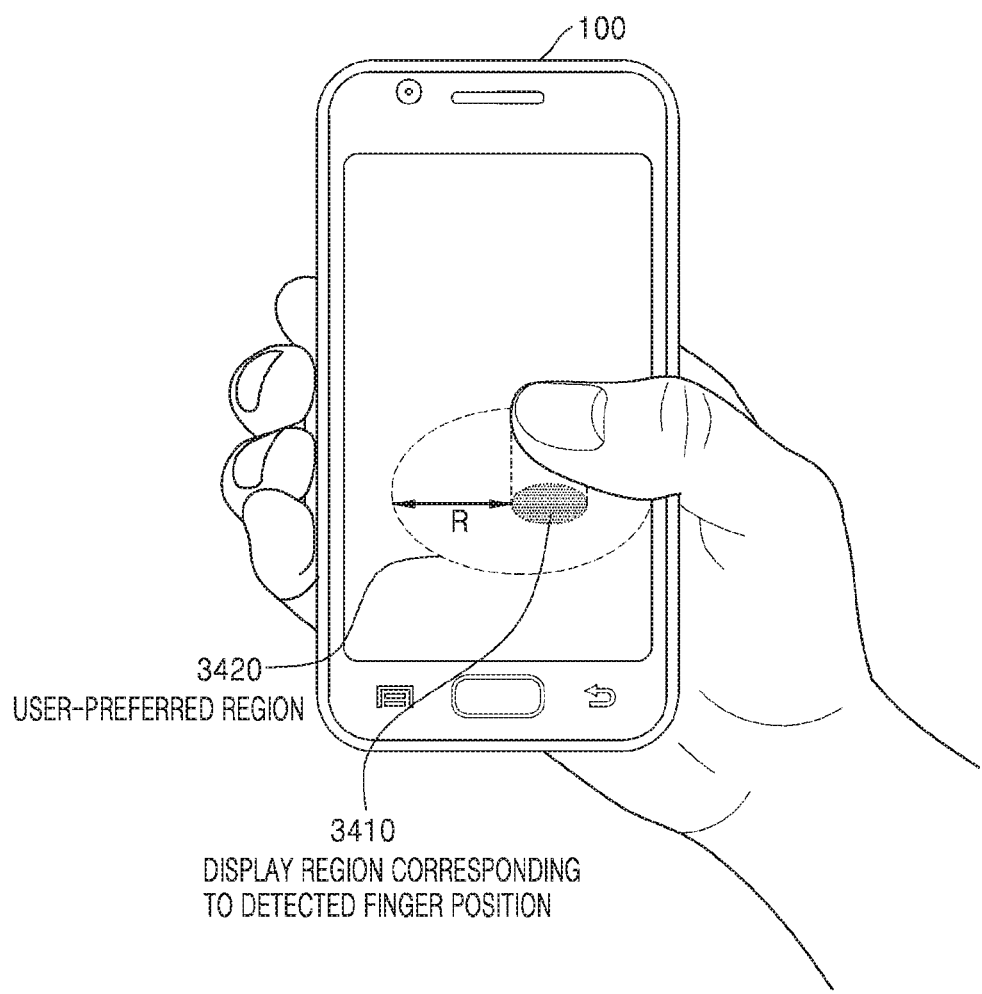
FIG. 34 is a reference view illustrating determination of a user-preferred region on the basis of a finger position of a user according to an exemplary embodiment.

FIG. 34 is a reference view illustrating determination of a user-preferred region on the basis of a finger position of a user according to an exemplary embodiment.

Referring to FIG. 34, the electronic device 100 may detect a display region 3410 corresponding to a finger position of the user who is using the electronic device 100. When the finger position of the user who is using the electronic device 100 is detected on the display, the electronic device 100 may determine that the display region 3410 corresponding to the finger position is a position currently most preferred by the user. Therefore, the electronic device 100 may determine a region within a certain range from the display region 3410 as a user-preferred region 3420, and display GUI elements, such as an event notification, in the determined user-preferred region 3420. When a user-preferred region is identified in this way, the user-preferred region may be adaptively changed in real time along with a real-time change in the finger position of the user.

According to exemplary embodiments, by displaying a GUI element in a region that is easily manipulated with a hand of a user or a preferred region that is frequently used by the user, simple manipulation of the displayed GUI element is possible even when the user manipulates an electronic device in a limited environment, such as with one hand.

The operating methods of an electronic device described herein may be embodied in the form of program instructions executable by various computing tools and recorded in a computer-readable recording medium. The computer-readable recording medium may include program instructions, data files, data structures, etc., solely or in combination. The program instructions recorded in the computer-readable recording medium may be specially designed or configured for the present disclosure, or may be known to and used by those of ordinary skill in the computer software art. Examples of the computer-readable recording medium include magnetic media, such as a hard disk, a floppy disk, and a magnetic tape, optical media, such as a compact disc ROM (CD-ROM) and a digital versatile disc (DVD), magneto-optical media, such as a floptical disk, and hardware devices, such as a ROM, a RAM, a flash memory, etc., specially configured to store and execute the program instructions. Examples of the program instructions include a high-level language code executable by a computer using an interpreter, etc. as well as a machine language code created by a compiler.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and detail may be made therein without departing from the spirit and scope as defined by the following claims.

What is claimed is:

1. An electronic device comprising:
   a touch-screen display; and
   at least one processor configured to:
      monitor quantities of user touch inputs at locations in the touch-screen display at which the user touch inputs in the electronic device occur;
      identify at least one location at which the quantities of monitored user touch inputs exceed a threshold value, from among locations at which quantities of monitored user touch inputs are detected;
      identify a user-preferred region of the touch-screen display at which a user prefers to provide a touch input to interact with a graphical user interface (GUI) element displayed thereon, based on the identified at least one location, the user-preferred region being identified by a region covering the identified at least one location at which the quantities of monitored user touch inputs exceed the threshold value or by a region which is determined using a predefined distance from the identified at least one location at which the quantities of monitored user touch inputs exceed the threshold value; and
      based on identifying the user-preferred region of the touch-screen display, control the touch-screen display to display a GUI comprising a GUI element located in the identified user-preferred region.

2. The electronic device of claim 1, wherein the at least one processor is further configured to detect orientation of the electronic device, and identify the user-preferred region further based on the orientation.

3. The electronic device of claim 1, wherein the at least one processor is further configured to detect a hand of the user that grasps the electronic device, and identify the user-preferred region further based on the hand of the user.

4. The electronic device of claim 1, wherein the at least one processor is further configured to identify the user-preferred region of the touch-screen display using a heat map or a density map to store interaction history comprising the quantities of user touch inputs at regions in the touch-screen display at which the user touch inputs between the user and the electronic device occur.

5. The electronic device of claim 1, wherein the at least one processor is further configured to monitor the quantities of user touch inputs at regions in the touch-screen display at which the user touch inputs between the user and the electronic device occur during execution of one or more applications.

6. The electronic device of claim 1, wherein the at least one processor is further configured to identify the user-preferred region further based on user preference.

7. The electronic device of claim 1, wherein, when a size of the user-preferred region is insufficient to display the at least one GUI element, the at least one processor is further configured to control the touch-screen display to display a group object corresponding to the at least one GUI element in the user-preferred region, and display the at least one GUI element corresponding to the group object in response to an input of selecting the group object.

8. The electronic device of claim 1, wherein the user-preferred region is a range in which the electronic device is operated by one hand of the user.

9. The electronic device of claim 1, wherein the at least one GUI element displayed in the user-preferred region comprises an icon for an event notification.

10. The electronic device of claim 1, wherein the touch-screen display extends to one or more edges of the electronic device, and
   the at least one processor is further configured to identify the user-preferred region on a display region arranged at the one or more edges.

11. An operating method of an electronic device, the method comprising:
   monitoring, by at least one processor of the electronic device, quantities of user touch inputs at locations in a touch-screen display of the electronic device at which the user touch inputs in the electronic device occur;
   identifying, by the at least one processor, at least one location at which the quantities of monitored user touch inputs exceed a threshold value, from among locations at which quantities of monitored user touch inputs are detected;
   identifying, by the at least one processor, a user-preferred region of the touch-screen display at which a user prefers to provide a touch input to interact with a graphical user interface (GUI) element displayed thereon, based on the identified at least one location, the user-preferred region being identified by a region covering the identified at least one location at which the quantities of monitored user touch inputs exceed the threshold value or by a region which is determined using a predefined distance from the identified at least one location at which the quantities of monitored user touch inputs exceed the threshold value; and
   displaying, on the touch-screen display, a GUI comprising a GUI element located in the identified user-preferred region, based on identifying the user-preferred region of the touch-screen display.

12. The operating method of claim 11, wherein the identifying of the user-preferred region comprises detecting orientation of the electronic device, and identifying the user-preferred region further based on the orientation.

13. The operating method of claim 11, wherein the identifying of the user-preferred region comprises detecting a hand of the user that grasps the electronic device, and identifying the user-preferred region further based on the hand of the user.

14. The operating method of claim 11, wherein the identifying of the user-preferred region comprises identifying the user-preferred region of the touch-screen display using a heat map or a density map to store interaction history comprising the quantities of user touch inputs at regions in the touch-screen display at which the user touch inputs between the user and the electronic device occur.

15. The operating method of claim 14, wherein the monitoring the quantities of user touch inputs is performed during execution of one or more applications.

16. The operating method of claim 11, wherein the identifying of the user-preferred region comprises identifying the user-preferred region further based on user preference.

17. The operating method of claim 11, wherein the displaying of the at least one GUI element comprises, when a size of the identified user-preferred region is insufficient to display the at least one GUI element, displaying a group object corresponding to the at least one GUI element in the user-preferred region, and displaying the at least one GUI element corresponding to the group object in response to an input of selecting the group object.

18. A computer program product including a computer-readable recording medium having recorded thereon a program for causing an electronic device to perform operations of:
  monitoring quantities of user touch inputs at locations in a touch-screen display of the electronic device at which the user touch inputs in the electronic device occur;
  identifying at least one location at which the quantities of monitored user touch inputs exceed a threshold value, from among locations at which quantities of monitored user touch inputs are detected;
  identifying a user-preferred region of the touch-screen display at which a user prefers to provide a touch input to interact with a graphical user interface (GUI) element displayed thereon, based on the identified at least one location, the user-preferred region being identified by a region covering the identified at least one location at which the quantities of monitored user touch inputs exceed the threshold value or by a region which is determined using a predefined distance from the identified at least one location at which the quantities of monitored user touch inputs exceed the threshold value; and
  based on identifying the user-preferred region of the touch-screen display, displaying a GUI comprising a GUI element located in the identified user-preferred region.

\* \* \* \* \*